(12) United States Patent
Katayama et al.

(10) Patent No.: US 6,505,594 B1
(45) Date of Patent: Jan. 14, 2003

(54) CONTROL APPARATUS FOR INTERNAL COMBUSTION ENGINE AND METHOD OF CONTROLLING INTERNAL COMBUSTION ENGINE

(75) Inventors: Akihiro Katayama, Susono (JP); Masanobu Kanamura, Mishima (JP); Satoru Watanabe, Susono (JP); Hidemi Ohnaka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 3 days.

(21) Appl. No.: 09/642,907

(22) Filed: Aug. 22, 2000

(30) Foreign Application Priority Data

Aug. 23, 1999 (JP) .............................. 11-235947
Sep. 27, 1999 (JP) .............................. 11-272804

(51) Int. Cl.[7] .............................................. F02D 41/06
(52) U.S. Cl. .............................. 123/179.18; 123/406.54
(58) Field of Search .......................... 123/366, 406.53, 123/406.54, 685, 491, 179.5, 179.18; 701/113

(56) References Cited

U.S. PATENT DOCUMENTS

| 4,344,397 A | 8/1982 | Geiger et al. ............... 123/339 |
|---|---|---|
| 4,378,770 A | 4/1983 | Ikeura | |

(List continued on next page.)

FOREIGN PATENT DOCUMENTS

| EP | 1 048 838 | 11/2000 | | |
|---|---|---|---|---|
| JP | 62-3139 | 1/1987 | | |
| JP | 62-32250 | 2/1987 | | |
| JP | 5-222997 | 8/1993 | | |
| JP | 170557 | * 7/1996 | ........... | F02D/41/06 |
| JP | 291467 | * 10/2000 | ........... | F02D/41/06 |
| JP | 59443 | * 3/2001 | ........... | F02D/41/06 |
| JP | 2001-59438 | 3/2001 | | |

OTHER PUBLICATIONS

Derwent–ACC–No.: 2001–277214, Copyright 1999, Derwent Information Ltd, 1 page, "Automatic Startup Controller for IC Engine, Effects Fuel Supply Control Whenever Engine RPM Exceeds Target Idling RPM After Engine Starting, to Revert Back to Target Idling Speed", 1999 (Abstract only).

Primary Examiner—Tony M. Argenbright
Assistant Examiner—Hai H. Huynh
(74) Attorney, Agent, or Firm—Oblon, Spivak, McClelland, Maier & Neustadt, P.C.

(57) ABSTRACT

A control apparatus for an internal combustion engine is provided which performs intake air flow control for controlling an engine speed to a target engine speed during starting of the engine, by adjusting a throttle opening depending upon the engine speed. The control apparatus judges a degree of deterioration of a combustion state in the engine, based on a difference between a predetermined reference peak engine speed and an actual peak engine speed, and switches from the intake air flow control to ignition timing control for controlling the engine speed when the engine operates in a poor combustion state, at a point of time that is determined based on the degree of deterioration of the combustion state.

26 Claims, 23 Drawing Sheets

U.S. PATENT DOCUMENTS

| | | | |
|---|---|---|---|
| 4,513,711 A | 4/1985 | Braun et al. .................. | 123/339 |
| 4,653,452 A | 3/1987 | Sawada et al. | |
| 5,081,973 A | 1/1992 | Minamitani .................. | 123/339 |
| 5,357,928 A * | 10/1994 | Ohtsuka ................ | 123/406.47 |
| 5,390,491 A * | 2/1995 | Suzumura et al. .......... | 123/686 |
| 5,535,586 A * | 7/1996 | Ohta et al. .............. | 123/406.52 |
| 5,586,534 A | 12/1996 | Fujimoto .................... | 123/325 |
| 5,615,660 A | 4/1997 | Iwano et al. | |
| 5,619,967 A * | 4/1997 | Streib ......................... | 123/399 |
| 5,711,272 A * | 1/1998 | Maegawa et al. ........... | 123/1 A |
| 5,752,488 A * | 5/1998 | Hattori et al. ......... | 123/179.16 |
| 5,829,410 A * | 11/1998 | Hirose ................... | 123/406.51 |
| 5,845,492 A * | 12/1998 | Isobe et al. .................... | 60/284 |
| 5,954,025 A * | 9/1999 | Kanamura et al. ..... | 123/179.16 |
| 5,974,792 A * | 11/1999 | Isobe .......................... | 60/278 |
| 6,152,105 A | 11/2000 | Nishimura et al. .... | 123/339.11 |
| 6,212,879 B1 | 4/2001 | Nishimura et al. ........... | 60/274 |
| 6,276,131 B1 * | 8/2001 | Ueno et al. ............ | 123/339.11 |
| 6,338,331 B1 * | 1/2002 | Watanabe et al. ...... | 123/179.18 |
| 6,360,160 B1 * | 3/2002 | Kanamaru et al. ........... | 123/491 |
| 6,367,446 B1 * | 4/2002 | Kanamura et al. ..... | 123/339.12 |
| 2002/0066436 A1 * | 6/2002 | Majima et al. ........ | 123/406.47 |

\* cited by examiner

CONTROL APPARATUS FOR INTERNAL COMBUSTION ENGINE AND METHOD OF CONTROLLING INTERNAL COMBUSTION ENGINE

INCORPORATION BY REFERENCE

The disclosures of Japanese Patent Applications No. HEI 11-235947 filed on Aug. 23, 1999 and HEI 11-272804 filed on Sep. 27, 1999 including the specification, drawings and abstract are incorporated herein by reference in its entirety.

BACKGROUND OF THE INVENTION

1. Field of the Invention

The present invention relates to a control apparatus of an internal combustion engine, and more particularly, to a control apparatus of an internal combustion engine for controlling an engine speed to a target value during starting of the engine. This invention is also concerned with a method of controlling an internal combustion engine during starting of the engine.

2. Discussion of Related Art

During starting of the engine, and especially, during cold start of the engine, a combustion state is likely to deteriorate, and the engine speed may become unstable. Such deterioration in the combustion state causes problems such as deterioration in engine-starting capability and exhaust properties, and increases in vibration and noise due to the unstable engine speed after starting.

Consequently, various control apparatuses have been proposed for preventing deterioration in the combustion state during starting of the engine so as to stabilize the engine speed. One example of such control apparatuses is described in Japanese Patent Laid-Open Publication No. 62-3139. This control apparatus sets a throttle opening to a target value according to a temperature of the engine cooling water during starting of the engine (the expression "during starting of the engine" as used herein refers to the period from the start of an engine starting operation, or start of cranking, until the engine is brought into a steady idle state after complete explosion in the engine). After the complete explosion in the engine, the control apparatus sets the throttle opening so that the engine speed reaches a target value. Another example of control apparatus is described in Japanese Patent Laid-Open Publication No. 5-222997. This control apparatus feedback-controls the intake air flow rate and ignition timing of the engine so that the engine speed reaches a predetermined target value during an idling operation after the start of the engine, whereby the idle speed is maintained at a constant value.

If the engine speed is controlled only by adjusting the throttle opening during starting of the engine, as in the control apparatus of the above-mentioned Japanese Patent Laid-Open Publication No. 62-3139, deterioration of the combustion state in the engine cannot be suppressed, but, on the contrary, may be increased. In an engine having a fuel injection valve for injecting fuel into an inlet port of the engine, for example, the fuel injected during cold start of the engine may adhere to a wall of the inlet port in a liquid form, i.e., without being vaporized. Therefore, the mixture may not have a sufficient concentration of vaporized fuel, with the result that the mixture has a lean air-fuel ratio, and the engine operates in a poor combustion state. In such a case, if the throttle opening is increased, a negative pressure of an inlet pipe downstream of the throttle valve is reduced (i.e., an absolute pressure is increased). As a result, the fuel deposited on the wall becomes less likely to be vaporized, whereby the combustion state is further deteriorated. Thus, by adjusting only the throttle opening, the engine speed may not be accurately controlled to the target value during starting of the engine.

In order to solve the above-mentioned problems, a further example of control apparatus has been proposed, which controls the engine speed during starting of the engine by adjusting a throttle opening (i.e., an intake air flow rate of the engine), and switching the engine speed control through adjustment of the throttle opening to engine speed control through adjustment of the ignition timing when the combustion state in the engine is deteriorated.

The control apparatus as described just above is adapted to determine deterioration of the combustion state based on the peak engine speed, fluctuations in the engine speed, or the like, during starting of the engine. When determining that the combustion state is deteriorated, the control apparatus starts performing engine speed control by adjusting the ignition timing, or increasing the fuel injection amount, instead of adjusting the throttle opening, so as to prevent deterioration in the combustion state. In this way, deterioration in the combustion state is suppressed. It should be noted that, hereinafter, controlling the engine speed by adjusting the throttle opening will be simply referred to as "throttle valve control" or "intake air flow control"; controlling the engine speed by adjusting the ignition timing of the engine will be simply referred to as "ignition timing control"; and controlling the engine speed by increasing the fuel injection quantity will be simply referred to as "fuel injection quantity control."

As a result of subsequent studies, it was reveled that the control apparatus as described above switches the engine speed control from the throttle valve control to the ignition timing control or injection quantity control as soon as it determines a poor combustion state in the engine, and that a favorable result cannot always be obtained in terms of maintaining an excellent exhaust properties.

For example, during starting of the engine, the ignition timing of the engine is generally delayed with respect to that during normal operations, in order to increase an exhaust temperature and quickly raise a temperature of an exhaust purifying catalyst disposed in an exhaust passage to a catalyst-activating temperature. However, if the control apparatus switches the engine speed control from the throttle valve (intake air flow rate) control to the ignition timing control, the ignition timing of the engine is advanced with respect to that during the normal starting. As a result, the exhaust temperature is reduced, and the temperature rise of the catalyst is delayed. Accordingly, if the engine speed control is performed by adjusting the ignition timing during starting of the engine, warm-up of the catalyst is delayed, and the engine is operated for a long time without sufficiently purifying the exhaust. In addition, when the engine speed control is switched from the throttle valve control to the injection quantity control, the amount of unburned components HC and CO in the exhaust is increased, and the exhaust properties are thus degraded. Therefore, in controlling the engine speed during starting of the engine, it is preferable to maintain the throttle valve control as long as possible without switching to the ignition timing or fuel injection quantity control. However, the control apparatus as described above switches to the ignition time or injection quantity control as soon as the combustion state is deteriorated. Such switching may possibly degrade the exhaust properties even if the deterioration in the combustion state could be suppressed only by the throttle valve control.

Moreover, in the control apparatus as described above, the timing of starting the engine speed control during starting of the engine is not sufficiently considered. For example, after the engine starting operation (cranking) is started, the engine speed rapidly increases when combustion is started in all cylinders of the engine. Then, the engine speed reaches a peak value, and is then reduced down to a constant value. During starting of the engine, the engine speed needs to be controlled so that it quickly settles or converges at a predetermined target value. However, with the engine speed changing as described above after the engine starting operation is started, the time required for the engine speed to be settled at the target value after the engine starting operation is started depending upon the timing of starting the engine speed control.

As described above, the control apparatus as described above switches from the intake air flow control to the ignition timing control depending upon whether the engine is operation in a poor combustion state or not. However, the time required for the engine speed to be settled at the target value may be increased depending upon a method of controlling the engine speed by adjusting ignition timing after the switching.

SUMMARY OF THE INVENTION

It is therefore a first object of the present invention to provide a control apparatus for an internal combustion engine, which is capable of accurately maintaining the engine speed at a target value while effectively suppressing deterioration in the combustion state during starting of the engine, and is also capable of suppressing degradation in exhaust properties during starting of the engine.

It is a second object of the present invention to provide a control apparatus of an internal combustion engine, which is capable of quickly settling the engine speed at a target value during starting of the engine.

To accomplish the first object, a control apparatus for an internal combustion engine is provided according to the first aspect of the present invention, which apparatus controls an engine speed to a target value during starting of the engine, by performing at least one control including intake air flow control under which an intake air flow rate is adjusted in accordance with the engine speed, and ignition timing control under which the ignition timing is adjusted in accordance with the engine speed, and comprises: a parameter acquiring unit that obtains a parameter that represents a degree of deterioration of a combustion state in the engine; and a switching unit that control switching from the intake air flow control to the ignition timing control based on the parameter obtained in said calculating unit.

In the control apparatus as described above, the parameter acquiring unit may calculate a difference between a predetermined reference peak engine speed and an actual peak engine speed during starting of the engine, to provide the parameter, and the switching unit may switch from the intake air flow control to the ignition timing control, depending upon the difference between the peak engine speeds.

Where the combustion state in the engine is deteriorated, the peak engine speed during starting of the engine is reduced, and therefore a difference between the reference peak engine speed and the peak engine speed increases in accordance with the deterioration of the combustion state. The reference peak engine speed is set to a standard peak engine speed achieved where the combustion state is not deteriorated, and a difference between the peak engine speeds is set in advance for the case where the combustion state is most deteriorated in a range in which the engine speed can be controlled by the intake air flow control. If the actual difference between the peak engine speeds becomes larger than the difference thus set in advance, the intake air flow control is switched to the ignition timing control, thus preventing unnecessary switching to the ignition timing control. With this arrangement, the intake air flow control is performed as long as possible even during poor combustion in the engine, thus preventing deterioration of the exhaust properties.

To accomplish the second object, a control apparatus for an internal combustion engine is provided according to a second aspect of the present invention, which performs engine speed control for controlling an engine speed to a predetermined target value in a feedback manner during starting of the engine, and comprises: an integrating unit that integrates an intake air quantity that has been introduced into the engine since the start of an engine starting operation; and a control unit that starts the engine speed control when an integrated value of the intake air quantity calculated by the integrating unit reaches a value that is equal to a volume of an intake air passage that extends from a throttle valve to an inlet of each cylinder.

In the control apparatus as described above, the engine speed feedback control during starting of the engine is started at a point of time when the integrated value of the intake air quantity becomes equal to a volume of the intake air passage disposed downstream of the throttle valve, namely, at a point of time when the entire amount of the air retained in the intake passage downstream of the throttle valve is sucked or introduced into the engine upon start of the engine. In general, the engine speed control needs to be started as soon as possible so that the engine speed is settled at the target value in a short period of time. At the time of starting the engine, however, the air held at an atmospheric pressure is stored in the intake air passage downstream of the throttle valve, and the air thus stored downstream of the throttle valve is introduced into the engine irrespective of the throttle opening once an engine start operation is started. Namely, the intake air quantity or flow rate cannot be accurately controlled during this period even if the throttle opening is changed, and therefore the engine speed cannot be controlled by adjusting, for example, the intake air flow rate. According to the present invention, the engine speed control is immediately started at a point of time when the entire amount of the air in the intake passage downstream of the throttle valve has been introduced into the engine, namely, when it becomes possible to perform accurate engine speed control. With this arrangement, the engine speed during starting of the engine settles or converges at the target engine speed in a short time.

DETAILED DESCRIPTION OF THE PREFERRED EMBODIMENTS

Figure 1:
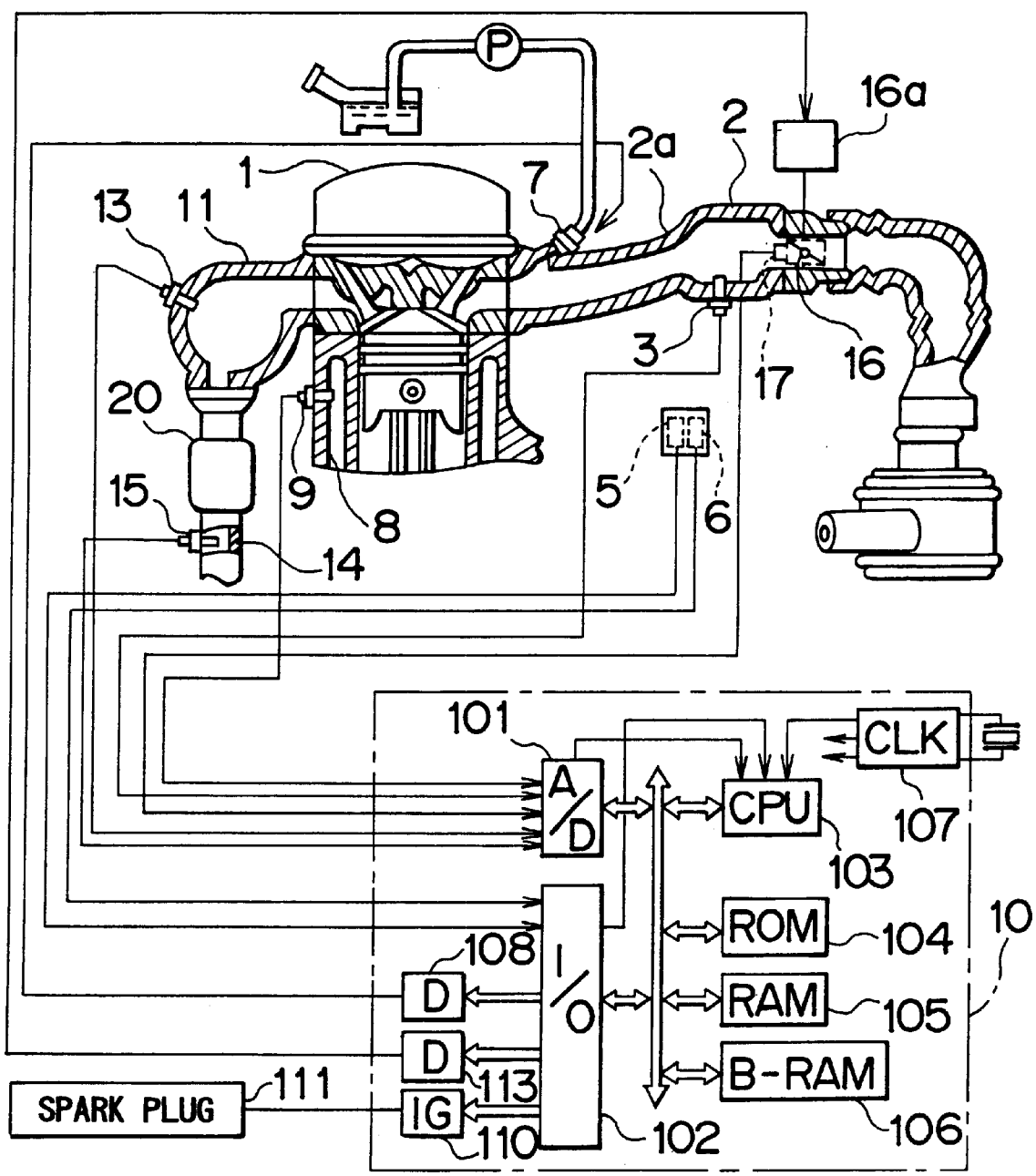
FIG. 1 is a view schematically showing the construction of an automotive internal combustion engine that employs a control apparatus according to one embodiment of the present invention.

FIG. 1 is a schematic diagram showing the overall construction of an automotive internal combustion engine that employs a control apparatus as one embodiment of the present invention. The internal combustion engine of FIG. 1 includes an engine body 1 (hereinafter referred to as "engine"), a surge tank 2 disposed in an intake-air passage of the engine 1, an intake manifold 2a connecting the surge tank 2 with an inlet port of each cylinder, a throttle valve 16 disposed in the intake-air passage upstream of the surge tank 2, and a fuel injection valve 7 for injecting pressurized fuel into the inlet port of each cylinder of the engine 1.

In the present embodiment, the throttle valve 16 includes an actuator 16a such as a step motor, and is opened according to a control signal received from an ECU (Electronic Control Unit) 10 which will be described later. More specifically, a so-called electronic controlled throttle valve that can be opened regardless of the amount of depression of an accelerator pedal by the driver is used as the throttle valve 16 of the present embodiment. The throttle valve 16 is also provided with a throttle-opening sensor 17 that is adapted to generate a voltage signal according to an operating amount (opening) of the throttle valve.

The internal combustion engine of FIG. 1 further includes an exhaust manifold 11 connecting an exhaust port of each cylinder with a common collecting exhaust pipe 14, a three-way catalyst 20 disposed in the exhaust pipe 14, an upstream air-fuel-ratio sensor 13 disposed in an exhaust joining portion (upstream of the three-way catalyst 20) of the exhaust manifold 11, and a downstream air-fuel-ratio sensor 15 disposed in the exhaust pipe 14 downstream of the three-way catalyst 20. The three-way catalyst 20 can simultaneously purify three components HC, CO and NOx in the exhaust when the air-fuel ratio of the exhaust introduced into the catalyst is near the stoichiometric air-fuel ratio. The air-fuel-ratio sensors 13 and 15 are used for detecting the air-fuel ratio of the exhaust in order to feedback-control a fuel injection quantity so that the air-fuel ratio of the engine reaches a certain target value during normal operation of the engine.

In the present embodiment, the surge tank 2 of the intake-air passage has an intake-pressure sensor 3 for generating a voltage signal representing an intake pressure (absolute pressure) within the surge tank 2. A water jacket 8 disposed in a cylinder block of the engine 1 has a water-temperature sensor 9 for generating an electric signal of an analog voltage that is proportional to the temperature of the cooling water.

In the meantime, the ECU 10 includes an analog-digital (A/D) converter 101 with a multiplexer incorporated therein, which converter receives respective output signals of the throttle-opening sensor 17, intake-pressure sensor 3, water-temperature sensor 9 and the air-fuel-ratio sensors 13 and 15 as indicated above.

Reference numerals 5 and 6 of FIG. 1 denote crank-angle sensors disposed near a camshaft and a crankshaft (both of which are not shown) of the engine 1, respectively. For example, the crank-angle sensor 5 generates a pulse signal for detecting a reference position, at intervals each corresponding to a crank angle of 720°, while the crank-angle sensor 6 generates a pulse signal for detecting a crank angle each time the crankshaft rotates 30°. The pulse signals of the crank-angle sensors 5 and 6 are supplied to an input/output (I/O) interface 102 of the ECU 10, wherein the output of the crank-angle sensor 6 is supplied to an interrupt terminal of a CPU (Central Processing Unit) 103 in the ECU 10. The ECU 10 calculates the engine speed (the number of revolutions of the engine 1 per unit time) based on the intervals of the crank-angle pulse signals from the crank-angle sensor 6, for use in various controls.

The ECU 10 of the engine 1 is formed as, for example, a microcomputer, and includes a ROM 104, a RAM 105, a backup RAM 106 capable of retaining stored data even if the main switch is turned off, a clock generating circuit 107 and the like, in addition to the A/D converter 101 with a built-in multiplexer, the I/O interface 102, and the CPU 103.

The ECU 10 performs basic control of the engine 1, for example, controls the fuel injection quantity and ignition timing, based on the intake pressure, throttle-valve opening, and the engine speed. Moreover, in the present embodiment, the ECU 10 performs engine speed control upon start of the engine to maintain the engine speed at a target value during a starting period of the engine (from the start of cranking until the engine operates in a steady idle state after completion of explosion in all cylinders), as described later.

In order to perform the above control, the ECU 10 converts an intake-pressure (PM) signal from the intake-pressure sensor 3, a throttle-opening (TA) signal from the throttle-opening sensor 17, and a cooling-water-temperature (THW) signal from the water-temperature sensor 9 into digital signals as input signals, according to an A/D conversion routine executed at fixed time intervals.

The I/O interface 102 of the ECU 10 is connected to the fuel injection valve 7 through a driving circuit 108, and controls the quantity of fuel injected from the fuel injection valve 7, and the fuel injection timing. The I/O interface 102 is also connected to each spark plug 111 of the engine 1 via an ignition circuit 110, and controls the ignition timing of the engine. Moreover, the I/O interface 102 is connected to the actuator 16a of the throttle valve 16 via a driving circuit 113, and drives the actuator 16a to control the opening of the throttle valve 16.

Next, the engine sped control upon start of the engine according to the present embodiment will be described. In the present embodiment, during a starting period of the engine, i.e., from the start of an engine starting operation (or the start of cranking) until the engine begins to operate in a steady idle state after completion of explosion in all cylinders, the ECU 10 performs engine speed control so as to maintain the engine speed at a predetermined target value (in general, a fast idle speed for accelerating warm-up of the engine). At the beginning of the engine cranking, the fuel injection quantity of the engine is normally set to a basic injection quantity for starting, which is determined based on the cooling-water temperature and the engine speed, and is corrected in accordance with the intake-air temperature (ambient temperature) and atmospheric pressure. When the engine speed exceeds a predetermined value (e.g., about 400 rpm) that is higher than the cranking speed after the start of cranking (i.e., when combustion is started in each cylinder and the engine is judged as completing explosion in all cylinders), the fuel injection quantity is set to a value obtained by multiplying a basic fuel injection quantity by a predetermined coefficient. The basic fuel injection quantity is determined based on the intake air flow rate and the engine speed, and is required to maintain the combustion air-fuel ratio at the stoichiometric air-fuel ratio. The predetermined coefficient is used to compensate for degradation in a vaporization state of the fuel resulting from a low temperature and adhesion of the injected fuel to the wall of the inlet port during starting of the engine. In the starting period of the engine, therefore, the predetermined coefficient is set to a value higher than 1, and the combustion air-fuel ratio is set to be richer than the stoichiometric air-fuel ratio.

The exhaust purifying catalyst (denoted by 20 in FIG. 1) disposed in the exhaust passage has a low temperature during the starting period of the engine, and therefore the catalyst cannot perform its exhaust-purifying function. Accordingly, the catalyst temperature must be raised to an activation temperature immediately after the start of the engine so that the catalyst can start purifying the exhaust gas. Thus, the ignition timing of the engine is normally delayed during starting of the engine, as compared to that during a normal operation of the engine, in order to raise the exhaust temperature and quickly raise the catalyst temperature.

As described above, the fuel injection quantity during starting of the engine is appropriately set depending upon various factors. If the engine is in a normal state, therefore, the engine speed is normally less likely to fluctuate due to poor combustion during starting of the engine. In some cases, however, the engine speed may fluctuate due to poor combustion even if the engine is in a normal state. For example, if a property of the fuel (gasoline) used for the engine is different, the combustion state is likely to deteriorate during starting of the engine if the engine uses fuel (gasoline) having different properties than that having standard properties. In this connection, the fuel injection quantity during starting of the engine is set on the assumption that a fuel having standard properties is used in the engine. If a fuel that is less volatile than the standard fuel, which will be called "heavy fuel", is used in the engine, the combustion state may deteriorate especially during cold start of the engine. More specifically, since the heavy fuel is less volatile than the standard fuel, a higher proportion of the fuel adheres to the wall of the inlet port in a liquid form without being vaporized, as compared with the standard fuel, even if the same quantity of fuel is injected. As a result, the quantity of fuel actually supplied to the cylinders is reduced. Consequently, the combustion air-fuel ratio of the engine is shifted to the leaner side than usual, thereby making the engine speed unstable due to the poor combustion state.

In general, as a method of preventing the engine speed from becoming unstable during starting of the engine and maintaining the engine speed at a predetermined target value, the intake air flow rate is controlled in a feedback manner based on the engine speed. The feedback control of the intake air flow rate based on the engine speed will be hereinafter called "intake air flow control". In the intake air flow control, the engine speed is maintained at the target value by the following feedback control: when the engine speed is lower than the target value, the opening of the throttle valve 16 is increased (i.e., the intake air flow rate is increased) so as to increase the engine speed. When the engine speed is higher than the target value, the opening of the throttle valve 16 is reduced (i.e., the intake air flow rate is reduced) so as to lower the engine speed. Where the heavy fuel is used, however, such a method may not be able to suppress or prevent poor combustion in the engine. As a result, the engine speed may not be maintained at the target value during starting of the engine.

In the case where the combustion air-fuel ratio of the engine becomes lean due to the use of the heavy fuel, resulting in poor combustion, during starting of the engine, and the engine speed is reduced due to the poor combustion, the opening of the throttle valve is increased under the intake air flow control so as to increase the engine speed. If the throttle opening is increased, however, a negative pressure in the intake-air passage downstream of the throttle valve is reduced (i.e., an absolute pressure is increased), whereby the injected fuel becomes less likely to be vaporized. This causes the combustion air-fuel ratio of the engine to be further shifted to the leaner side, resulting in further deterioration in the combustion state.

In the present embodiment, when the engine speed is reduced due to poor combustion during starting of the engine, the engine speed is maintained at the target value by using the following methods depending on the degree of deterioration of combustion (depending on how heavy the fuel is).

(i) Ignition Timing Control

When it is determined that the intake air flow control cannot compensate for a reduction in the engine speed caused by poor combustion during starting of the engine, the ignition timing control is performed in place of the intake air flow control, for controlling the engine speed in the present embodiment. In the ignition timing control, the engine speed is maintained at the target value by feedback-controlling the ignition timing based on the engine speed. As described above, the ignition timing is delayed during starting of the engine so as to warm up the catalyst. If the heavy fuel is used, however, the combustion rate of the air-fuel mixture within the cylinders is reduced due to an increase in the air-fuel ratio (a leaner mixture in the combustion chamber). By advancing the ignition timing to compensate for the reduction in the combustion rate, therefore, the output torque of the cylinders is increased, whereby the engine speed is increased. If the ignition timing control is performed in this manner, however, the ignition timing of the engine is advanced with respect to that during normal starting, and the exhaust temperature is lowered, resulting in an increased time required for warming up the engine for activation of the catalyst. Thus, when the ignition timing control is performed, exhaust properties may deteriorate due to a delay in the activation of the catalyst.

(ii) Fuel Injection Quantity Control

In the case where combustion in the engine deteriorates to a great extent, and the ignition timing control cannot compensate for a reduction in the engine speed caused by the poor combustion, the injection quantity control, as well as the injection timing control, is performed to increase the quantity of fuel injected, thereby to control the engine speed. With the fuel injection quantity thus increased, a sufficient amount of vaporized fuel can be supplied to cylinders, thus compensating for poor vaporization due to the use of the heavy fuel, with the result that the engine speed is increased. The increase in the fuel injection quantity, however, results in increases in the amounts of unburned components such as HC and CO in the exhaust gas. Accordingly, the exhaust properties are further degraded compared to the case where only the ignition timing control is performed.

As described above, when the ignition timing control and fuel injection quantity control are performed in response to a poor combustion state during starting of the engine, the exhaust properties may be degraded. In the following embodiments, therefore, the engine speed is controlled by using the intake air flow control as much as possible even when poor combustion takes place. The intake air flow control is then switched to or replaced by the ignition timing control only when the intake air flow control by itself cannot improve the combustion state in the engine. In this way, degradation in the exhaust properties is suppressed.

Hereinafter, some specific examples of a method of controlling the engine speed during a starting period of the engine according to the present invention will be described.

(1) First Embodiment

In this embodiment, an engine combustion state is determined by comparing a peak value of the engine speed during starting of the engine (i.e., a peak engine speed), with a predetermined reference peak engine speed. Then, switching between the intake air flow control and the ignition timing control is controlled, depending upon the combustion state thus determined.

Figure 2:
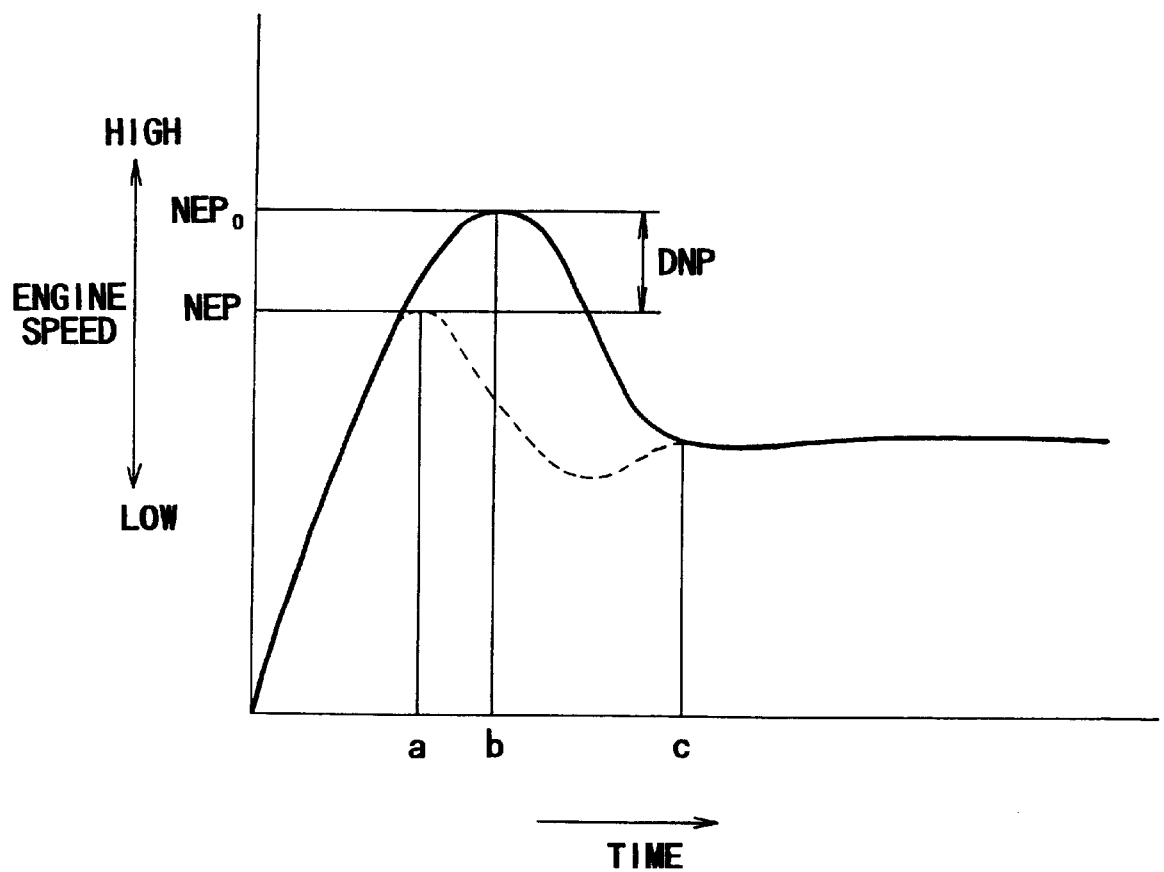
FIG. 2 is a graph showing changes in the engine speed during starting of the engine.

FIG. 2 is a graph showing changes in the engine speed during a starting period of the engine. In FIG. 2, the horizontal axis indicates time as measured from the start of cranking, and the vertical axis indicates engine speed. Also in FIG. 2, the solid line indicates changes in the engine speed where the combustion state is free from deterioration, and the dotted line indicates changes in the engine speed where the combustion state deteriorates (as in the case where a heavy fuel is used).

In FIG. 2, the solid line shows changes in the engine speed in the case where the engine is started using, for example, a highly volatile standard fuel. The engine speed increases after the start of cranking When explosion occurs in all cylinders (complete explosion), the engine speed rapidly increases to the peak value (point "b"in FIG. 2), and then decreases to the idle speed (point "c"). The dotted line of FIG. 2 shows changes in the engine speed in the case where a low volatile heavy fuel is used. In this case, too, the engine speed rapidly increases upon complete explosion. However, since the combustion state is deteriorated, and the torque generated at the cylinders is reduced, the peak value (point "a" in FIG. 2) is smaller than that of the solid line. Each peak value corresponds to the torque generated by the cylinders as a result of combustion. Thus, each peak value can be used as an indicator of the combustion state. More specifically, a difference between the peak engine speed $NEP_0$ for the standard fuel and excellent combustion state (the solid line in FIG. 2) and the peak engine speed NEP for the heavy fuel and poor combustion state (the dotted line in FIG. 2) represents a difference between the respective combustion states.

In the present embodiment, the peak engine speed $NEP_0$ during starting of the engine in a standard state (i.e., in the case where the highly volatile standard fuel is used) is stored in advance in the ROM of the ECU 10 as a reference peak engine speed. The peak engine speed NEP is measured during actual starting of the engine, and the current combustion state is determined based on a difference DNP between the reference peak engine speed $NEP_0$ and the actual peak engine speed NEP ($DNP=NEP_0-NEP$). Based on the result of the determination, switching between the intake quantity control and the ignition timing control is controlled.

Figure 3:
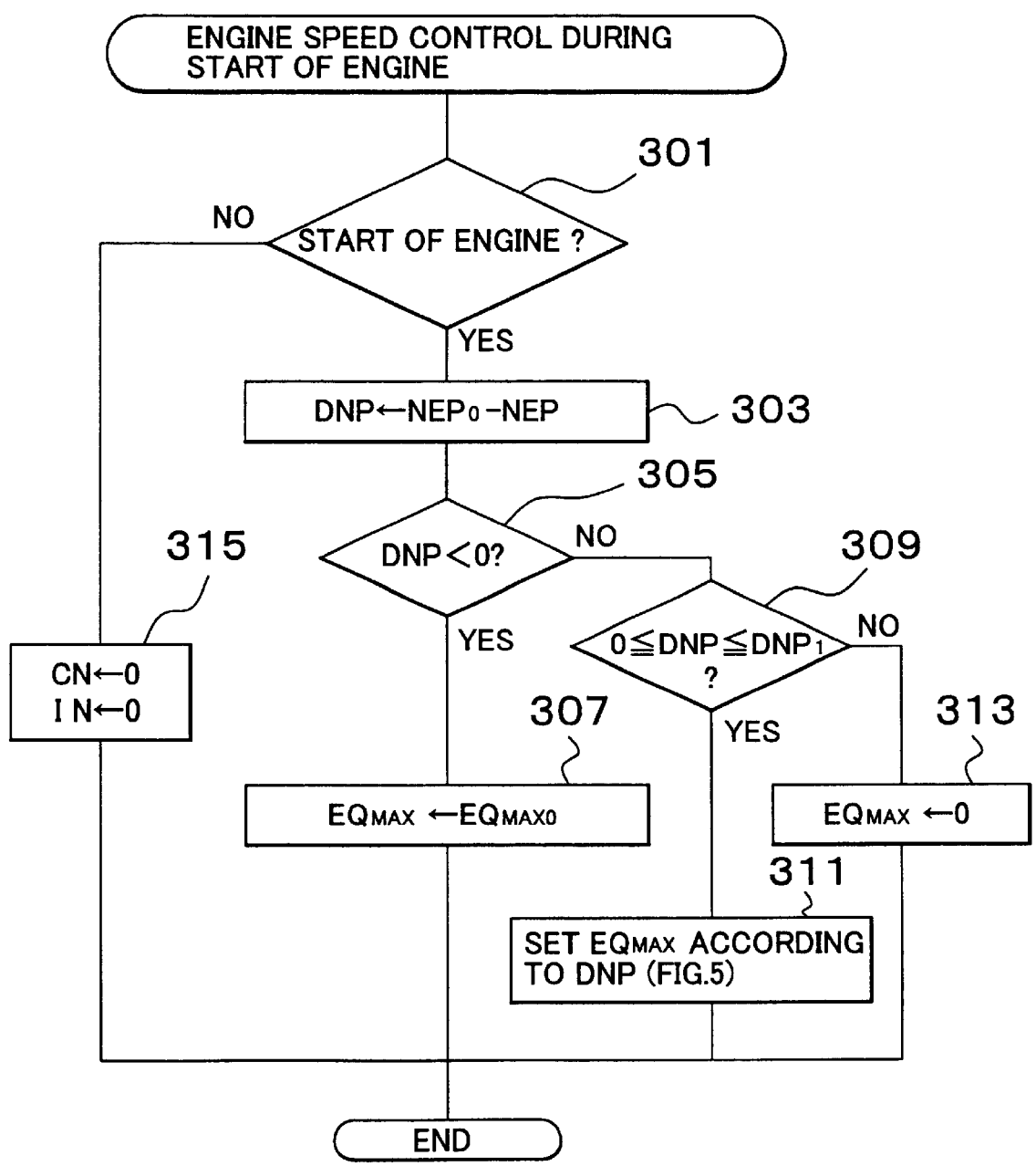
FIG. 3 is a flowchart illustrating a process of controlling the engine speed during starting of the engine according to the first embodiment of the present invention.

FIG. 3 is a flowchart illustrating a process of controlling the engine speed during starting of the engine according to the present embodiment. This control routine is executed by the ECU 10 at fixed time intervals.

When the process of FIG. 3 is started, step 301 is executed to determine whether the engine is being started or not, i.e., whether it is within a period of time to perform such engine speed control. For example, if a predetermined period of time has not passed since the engine starting operation (i.e., cranking) was started, step 301 determines that the engine is being started. Whether the engine is being started or not may alternatively be determined by, for example, determining whether the engine cooling water has reached a predetermined temperature or not. In this case, if the cooling water has not reached the predetermined temperature (i.e., if the engine has not been completely warmed up), it is determined that the engine is being started.

If step 301 determines that the engine is not being started ("NO" in step 301), it is determined that the engine speed need not be controlled since the engine has been completely warmed up and the combustion state is stable. In this case, the control flow goes to step 315 in which an intake air flow control flag CN and an ignition timing control flag IN are both set to zero, and the process is finished. As described later, when the flag CN is set to zero, the intake air flow control (FIG. 6) is discontinued. When the flag IN is set to zero, the ignition timing Control (FIG. 7) is discontinued. In the present embodiment, the flag CN is initially set to 1 (i.e., execution of the intake air flow control), and the flag IN is initially set to 0 (i.e., inhibition of the ignition timing control).

If step 301 determines that the engine is being started ("YES" in step 303), the difference DNP between the pre-stored reference peak engine speed $NEP_0$ and the actual peak engine speed NEP is calculated in step 303.

Figure 4:
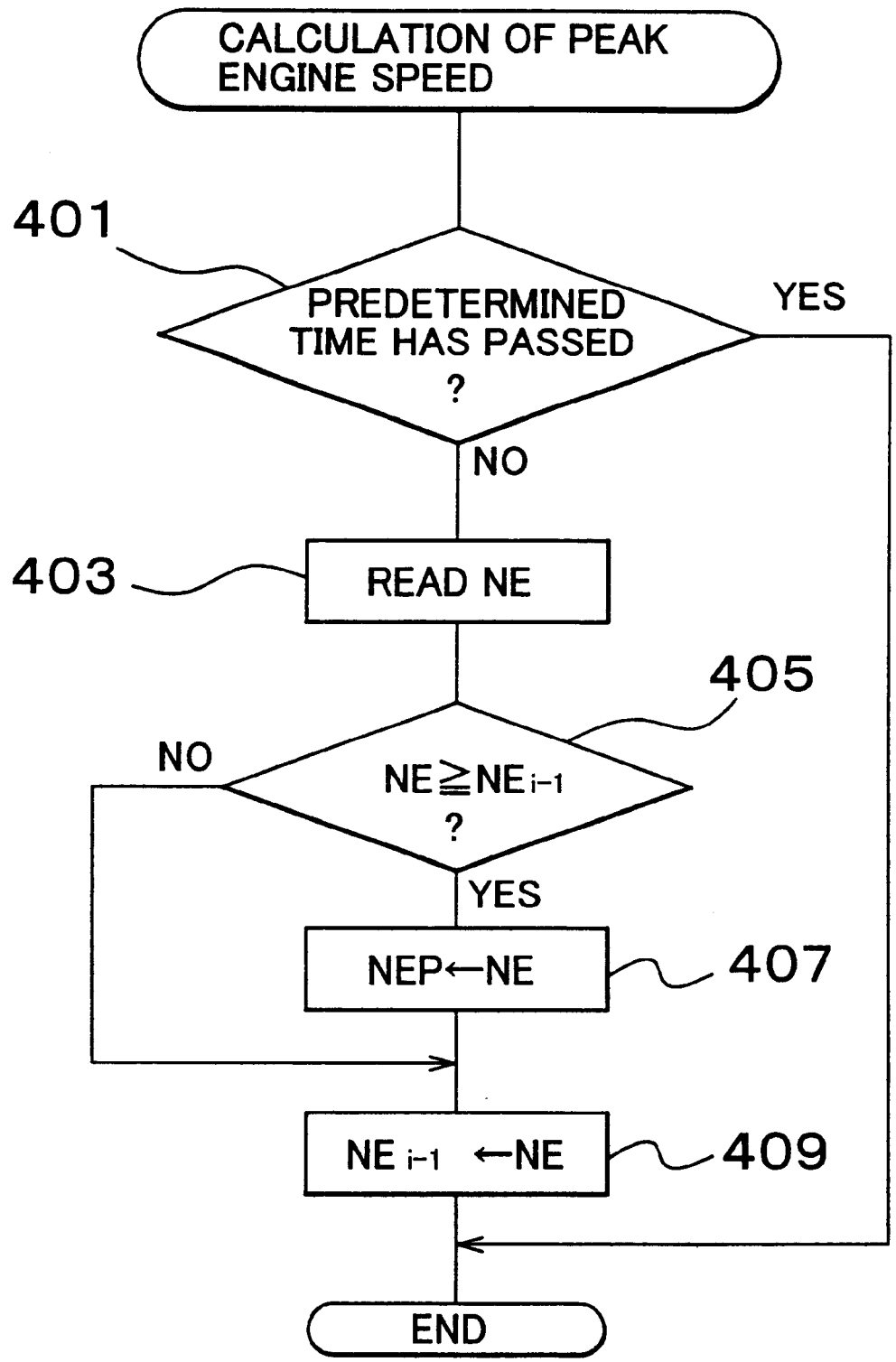
FIG. 4 is a flowchart illustrating a process of detecting a peak engine speed during starting of the engine according to the embodiment of FIG. 3.

FIG. 4 is a flowchart illustrating a process of calculating the peak engine speed NEP used in step 303 of FIG. 3. This process is performed according to a routine executed by the ECU 10 at fixed time intervals.

In the process of FIG. 4, during a certain period of time after the engine starting operation is started (i.e., a period of time long enough for the engine to be in a completely exploded state even in a poor combustion state) (step 401), the engine speed NE is read in step 403 in every control cycle. Then, the engine speed NE of the current cycle is compared with the engine speed $NE_{i-1}$ of the previous cycle (step 405). If $NE \geq NE_{i-1}$, that is, if the engine speed is increasing, the value of the peak engine speed NEP is replaced by the engine speed NE of the current cycle (step 407). Thus, the peak engine speed NEP is updated using the current engine speed as long as the engine speed keeps increasing. When the engine speed starts decreasing, however, NEP is no longer updated. As a result, at the time of complete explosion of the engine, NEP is set to the peak engine speed. This process continues until step 401 determines that the engine has reached a completely exploded state in which explosion occurred in all cylinders. In step 409 of FIG. 4, the value $NE_{i-1}$ is updated for the next control cycle.

In step 303 of FIG. 3, the difference DNP in the peak engine speed is calculated using the peak engine speed NEP obtained in the process described above. Thereafter, in steps 305 to 313, an upper limit $EQ_{MAX}$ of an intake feedback correction for use in the intake air flow control which will be described later is set according to the difference DNP thus calculated. In the present embodiment, the timing of switching from the intake air flow control to the ignition timing control is controlled by varying the upper limit $EQ_{MAX}$ of the intake feedback correction.

Before explaining steps 315 to 313, the intake air flow control and the ignition timing control according to the present embodiment will be described with reference to FIGS. 6 and 7.

Figure 6:
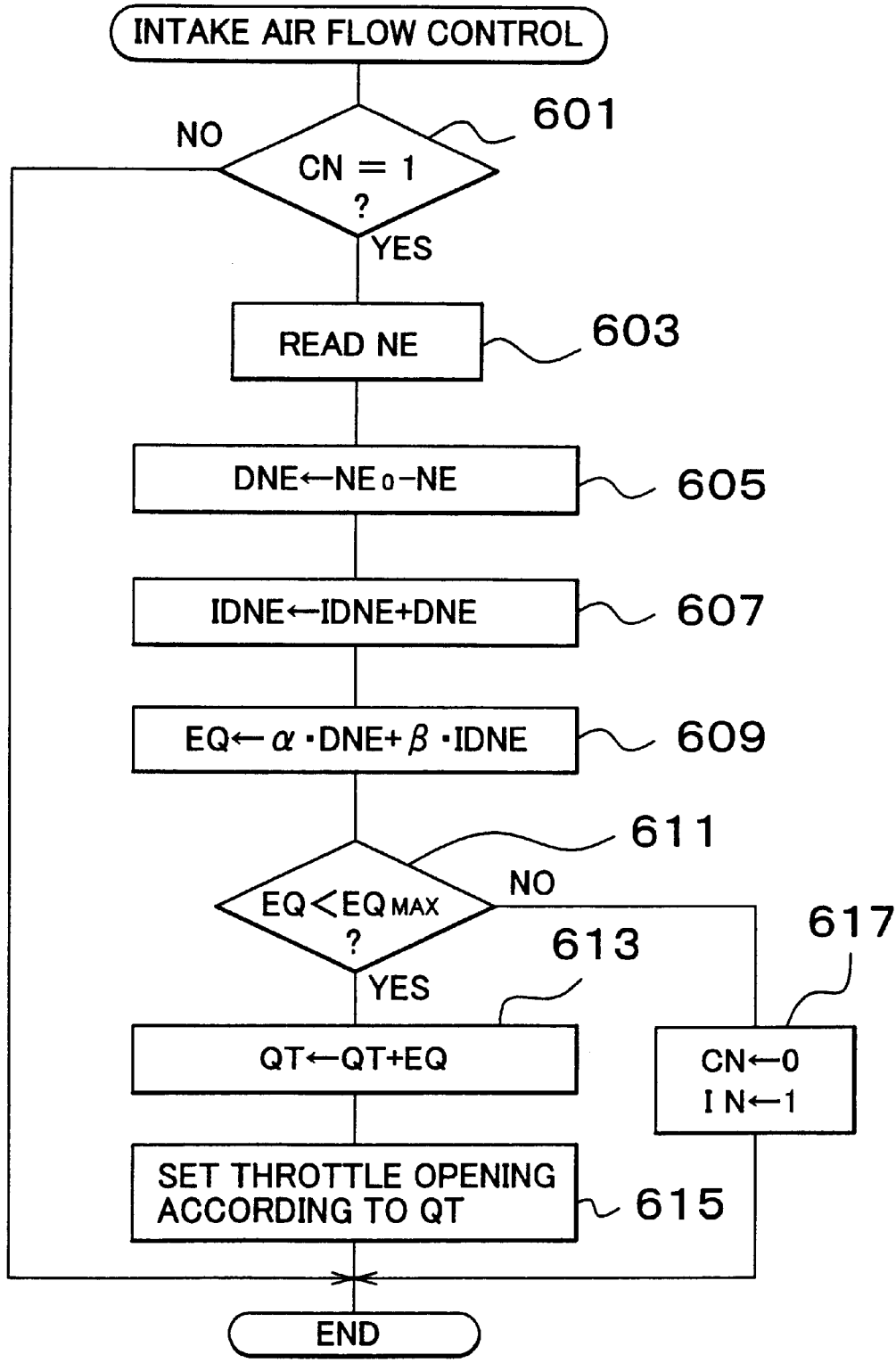
FIG. 6 is a flowchart illustrating a process of the intake air flow control.

FIG. 6 is a flowchart illustrating an intake air flow control routine or process. This control routine is executed by the ECU 10 at fixed time intervals. In the process of FIG. 6, step 601 is initially executed to determine whether the intake air flow control flag CN has been set to 1 or not. If CN≠1 ("NO" in step 601), the intake air flow control is not currently permitted to be executed, and thus the process is immediately finished without executing step 603 and the subsequent steps.

If CN=1 in step 601 ("YES" in step 601), the control flow goes to step 603 in which the current engine speed NE is read. Then, in step 605, the difference DNE between a predetermined target idle speed $NE_0$ and the current engine speed NE is calculated as $DNE = NE_0 - NE$.

In steps 607 and 609, PI control (Proportional Integral control) of the intake air flow rate of the engine is performed based on the deviation DNE calculated in step 605. More specifically, in step 607, an integral term IDNE of the deviation DNE is calculated. In step 609, a feedback correction EQ of the intake air flow rate is calculated using the integral term IDNE and the proportional term DNE, as given by the expression: $EQ = \alpha \times DNE + \beta \times IDNE$. step 611 is then executed to determine whether the resultant feedback correction EQ has reached the upper limit $EQ_{MAX}$ or not. If not, the current target intake air flow rate QT plus the feedback correction EQ is set as a new target intake air flow rate in step 613. In step 615, the actuator 16a is driven to adjust the opening of the throttle valve 16 so as to achieve the target intake air flow rate QT. Thus, when the engine speed NE is lower than the target idle speed $NE_0$, the intake air flow rate QT is increased upon execution of each control cycle. When the engine speed NE is higher than the target value $NE_0$, the intake air flow rate QT is reduced upon execution of each control cycle. In this manner, the engine speed is controlled to the target value $NE_0$.

Where a heavy fuel is used in the engine, for example, the engine speed becomes lower than the target value due to a poor combustion state, and therefore the feedback correction EQ is increased. Thus, the feedback correction EQ continues to be increased if the engine speed cannot be raised to the target value by the intake air flow control.

When the feedback correction EQ reaches the upper limit $EQ_{MAX}$ in step 611, it is determined that the engine speed can no longer be controlled by the intake air flow control. Therefore, the intake air flow control is discontinued, and the ignition timing control is started. In other words, when the feedback correction EQ reaches the upper limit $EQ_{MAX}$ in step 611, the intake air flow control intake air flow control flag CN is set to zero ("discontinue"), and the ignition timing control executing flag IN is set to 1 ("execute") in step 617. Accordingly, in the next and subsequent cycles, the process of FIG. 6 is immediately finished after step 601, so that the intake air flow control is not performed. In addition, since the ignition timing control flag IN is set to 1, the intake air flow control of FIG. 6 is replaced by the ignition timing control (FIG. 7).

Figure 7:
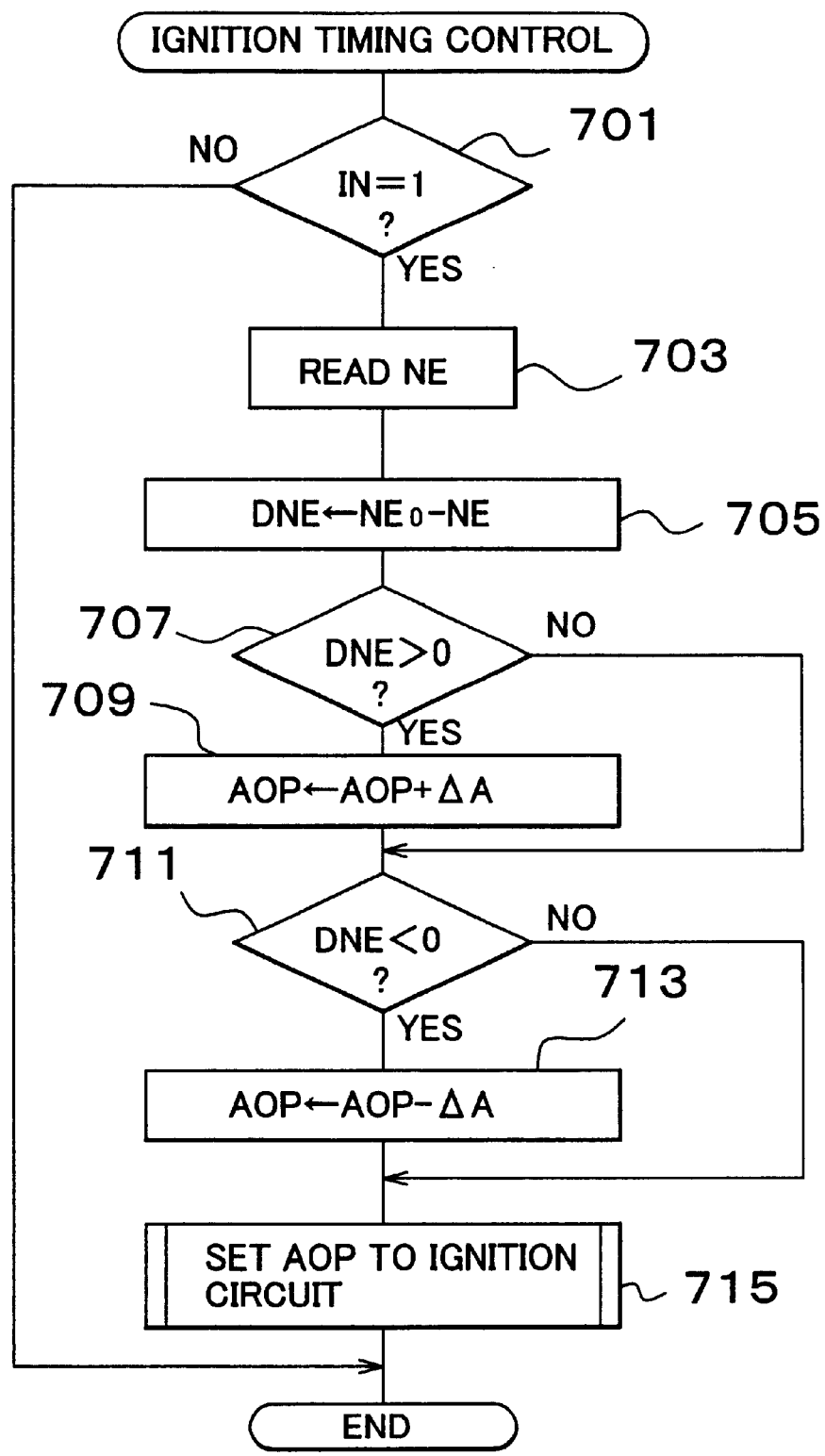
FIG. 7 is a flowchart illustrating a process of the ignition timing control.

FIG. 7 is a flowchart illustrating an ignition timing control routine or process according to the present embodiment. This control routine is executed by the ECU 10 each time the crankshaft of the engine revolves a predetermined angle.

In the process of FIG. 7, step 701 is initially executed to determine whether the ignition timing control flag IN has been set to 1 or not. step 703 and subsequent steps of the ignition timing control are performed only if IN=1. In the ignition timing control of the present embodiment, the difference DNE between the target idle speed $NE_0$ and the current engine speed NE is calculated ($DNE = NE_0 - NE$) (steps 703, 704). If DNE>0 (if the engine speed NE is lower than the target value $NE_0$), the ignition timing obtained by advancing the current ignition timing AOP (expressed as a crank angle before the top dead center) by a certain amount $\Delta A$ is set as the ignition timing AOP (steps 707, 709), so that the engine speed is increased to be close to the target value. If DNE<0, that is, if the actual engine speed NE is higher than the target value $NE_0$, on the other hand, the ignition timing obtained by delaying the current ignition timing AOP by the certain amount $\Delta A$ is set as the ignition timing AOP (steps 711, 713), so that the engine speed is reduced to be close to the target value $NE_0$. Then, the ignition timing AOP thus obtained is set to the ignition circuit (step 715), and the process is terminated. Through the process of FIG. 7, the engine speed is maintained at the target value $NE_0$.

As described above, in the present embodiment, when the feedback correction EQ of the intake air flow rate reaches the upper limit $EQ_{MAX}$ during execution of the intake air flow control, the engine speed control is switched from the intake air flow control to the ignition timing control. Accordingly, switching from the intake air flow control to the ignition timing is carried out earlier as the upper limit $EQ_{MAX}$ of the feedback correction EQ is smaller.

As described above, in the engine speed control during starting of the engine (FIG. 3) according to the present embodiment, the upper limit $EQ_{MAX}$ of the feedback correction is changed according to the difference DNP in the peak engine speed. In this manner, switching from the intake air flow control to the ignition timing control is controlled according to the degree of deterioration of the combustion state (i.e., according to the volatility of the heavy fuel).

Referring back to FIG. 3, setting of the upper limit $EQ_{MAX}$ of the feedback correction will be hereinafter described.

In the process of FIG. 3, after the peak engine speed DNP is calculated in step 303, step 305 is executed to determine whether the resultant value DNP is negative or not. If DNP is negative ("YES" in step 305), the peak engine speed NEP is higher than the reference peak engine speed $NEP_0$, and the combustion state is considered as not being deteriorated. Thus, if DNP<0, the upper limit $EQ_{MAX}$ of the feedback correction is set to a relatively large value (positive fixed value) $EQ_{MAX0}$ in step 307. If DNP>0 in step 305 ("NO" in step 305), the peak engine speed NEP is lower than the reference peak engine speed $NEP_0$. In this case, the engine is judged as being in a poor combustion state, and the control flow goes to step 309 in which the degree of deterioration of the combustion state is determined.

As described above, it is considered that the peak engine speed NEP is reduced in accordance with the degree of deterioration of the combustion state during starting of the engine. Therefore, in step 309, the upper limit $EQ_{MAX}$ is set depending upon the degree by which the actual peak engine speed NEP is lower than the reference peak engine speed $NEP_0$, that is, depending upon the magnitude of the difference DNP between the peak engine speeds.

More specifically, in step 309, whether the difference DNP is at most a predetermined positive value $DNP_1$ (i.e., $DNP \leq DNP_1$) or not is determined. If DNP is larger than $DNP_1$, that is, if the peak engine speed NEP is significantly reduced and the combustion state is deteriorated to a great extent ("NO" in step 309), the combustion state is not likely to be restored even if the intake air flow control is continued. In this case, the control flow goes to step 313 in which the upper limit $EQ_{MAX}$ of the feedback correction is set to zero. In the process of FIG. 6 that is concurrently executed as a separate process, step 611 immediately determines that $EQ>EQ_{MAX}$ ("NO" in step 611), and the intake air flow control is discontinued in step 617, while at the same time the ignition timing control of FIG. 7 is started.

If $DNP \leq DNP_1$ in step 309 ("YES" in step 309), the engine operates in a poor combustion state, but the engine speed can still be controlled by the intake air flow control unless the combustion state gets even worse. In other words, switching from the intake air flow control to the ignition timing control need not be performed immediately. Therefore, the control flow goes to step 311 in which the upper limit $EQ_{MAX}$ is set according to the value DNP so that the intake air flow control is continued for the possible maximum period of time. In this case, when the combustion state is deteriorated by a large degree (i.e., when the difference DNP in peak engine speed is large), the engine speed can possibly no longer be controlled under the intake air flow control if any further deterioration occurs in the combustion state. When the combustion state is deteriorated by a relatively small degree (i.e., when the difference DNP in peak engine speed is small), the engine speed can still be controlled under the intake air flow control even if the combustion state is somewhat further deteriorated. In the present embodiment, therefore, where the difference DNP between the peak engine speeds is in the region of $0 \leq DNP \leq DNP_1$, the upper limit $EQ_{MAX}$ is set to a smaller value as the difference DNP is larger. When the combustion state is further deteriorated, the feedback correction is increased in step 609 of FIG. 6. By setting the upper limit $EQ_{MAX}$ to a smaller value, therefore, switching to the ignition timing control is immediately carried out even if the combustion state is only slightly deteriorated compared to the current state.

Figure 5:
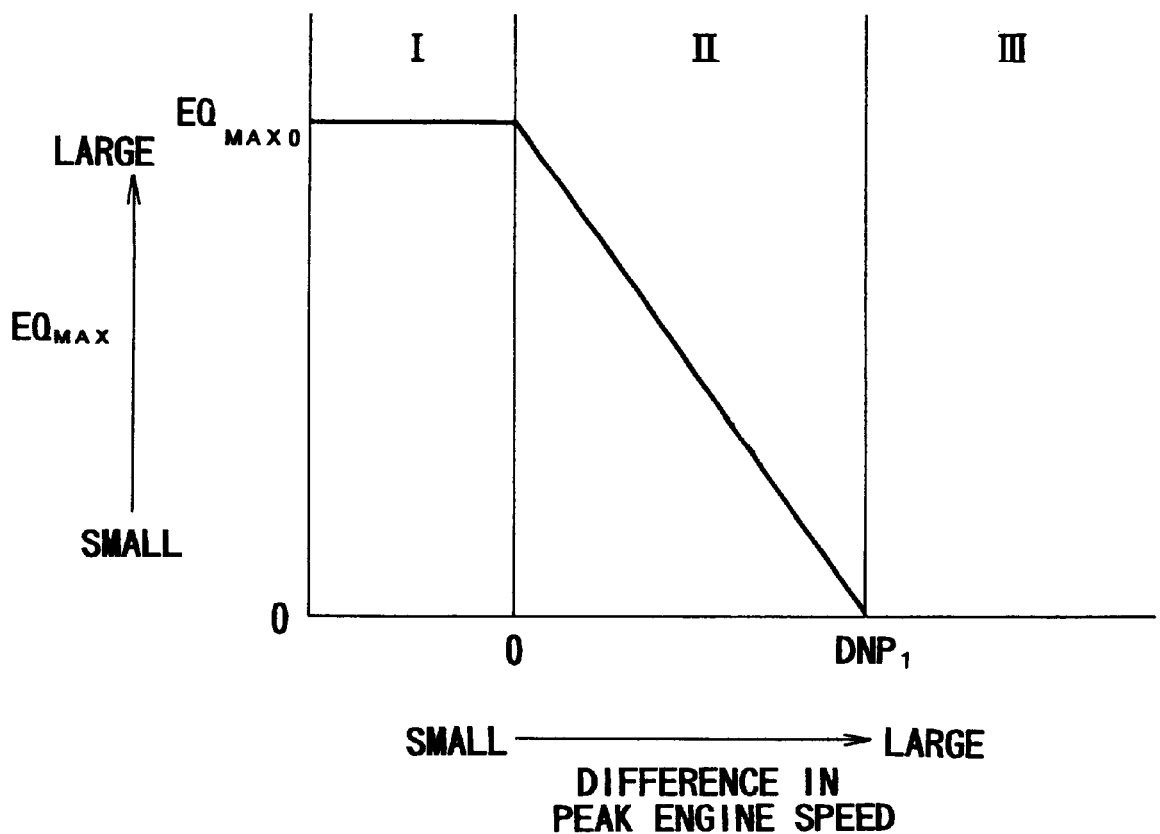
FIG. 5 is a graph showing the setting of a variable used in the flowchart of FIG. 3.

FIG. 5 is a diagram showing the relationship between the upper limit $EQ_{MAX}$ of the feedback correction that is set in steps 305 to 313 of FIG. 3 and the difference DNP of the peak engine speeds. As shown in FIG. 5, $EQ_{MAX}$ is set to a relatively large fixed value $EQ_{MAX0}$ in the region of DNP<0 (Region I in FIG. 5) (steps 305, 307 of FIG. 3). $EQ_{MAX}$ is linearly reduced from $EQ_{MAX0}$ to zero in the region of $0 \leq DNP \leq DNP_1$ (Region II in FIG. 5). In the region of $DNP>DNP_1$ (Region III in FIG. 5), $EQ_{MAX}$ is fixed to zero. Since $DNP_1$ assumes a different value depending on the type of the engine, it is actually preferable to determine $DNP_1$ through an experiment or the like.

As described above, in the present embodiment, the upper limit $EQ_{MAX}$ of the feedback correction is set in accordance with the difference DNP between the peak engine speeds, so that the intake air flow control can be continued as long as possible, thereby preventing degradation of the exhaust properties during starting of the engine. In addition, the upper limit $EQ_{MAX}$ is set to a smaller value as the degree of deterioration in the combustion state is larger (i.e., as the difference DNE is larger). With this arrangement, switching from the intake air flow control to the ignition timing control is conducted earlier, as the degree of deterioration of the combustion state is larger. Thus, according to the present embodiment, the engine speed can be converged or settled at the target value in a short time even if the engine operates in a poor combustion state.

(2) Second Embodiment

Hereinafter, the second embodiment of the present invention will be described. In the first embodiment, the peak engine speed during starting of the engine is used as a parameter representing the degree of deterioration in the combustion state. Thus, switching from the intake air flow control to the ignition timing control is controlled according to the degree of deterioration in the combustion state. The peak engine speed almost accurately represents the degree of deterioration in the combustion state. However, the peak engine speed may be increased even if the engine operates in a poor combustion state.

For example, if the fuel slightly leaks from the fuel injection valve while the engine is stopped, a larger quantity of fuel than usual is supplied to the cylinders during starting of the engine. In such a case, the torque generated at the cylinders is increased even if the fuel used is a heavy fuel and the engine is in a poor combustion state, and the peak engine speed may exceed the reference peak engine speed. In this case, if such leakage fuel is completely burned, the engine speed decreases as it does in the case of no fuel leakage. Moreover, since the peak engine speed during starting of the engine is high, and the combustion state is judged as not being deteriorated, the upper limit $EQ_{MAX}$ of the feedback correction is set to a large value $EQ_{MAX0}$ in the first embodiment, for example. As a result, the switching timing from the intake air flow control to the ignition timing control is delayed, resulting in an even worse combustion state.

Accordingly, in the present embodiment, another method of determining deterioration in the combustion state and switching the engine speed control is implemented concurrently with the method of switching the engine speed control based on the peak engine speed during starting of the engine as explained above in the first embodiment.

Figure 8:
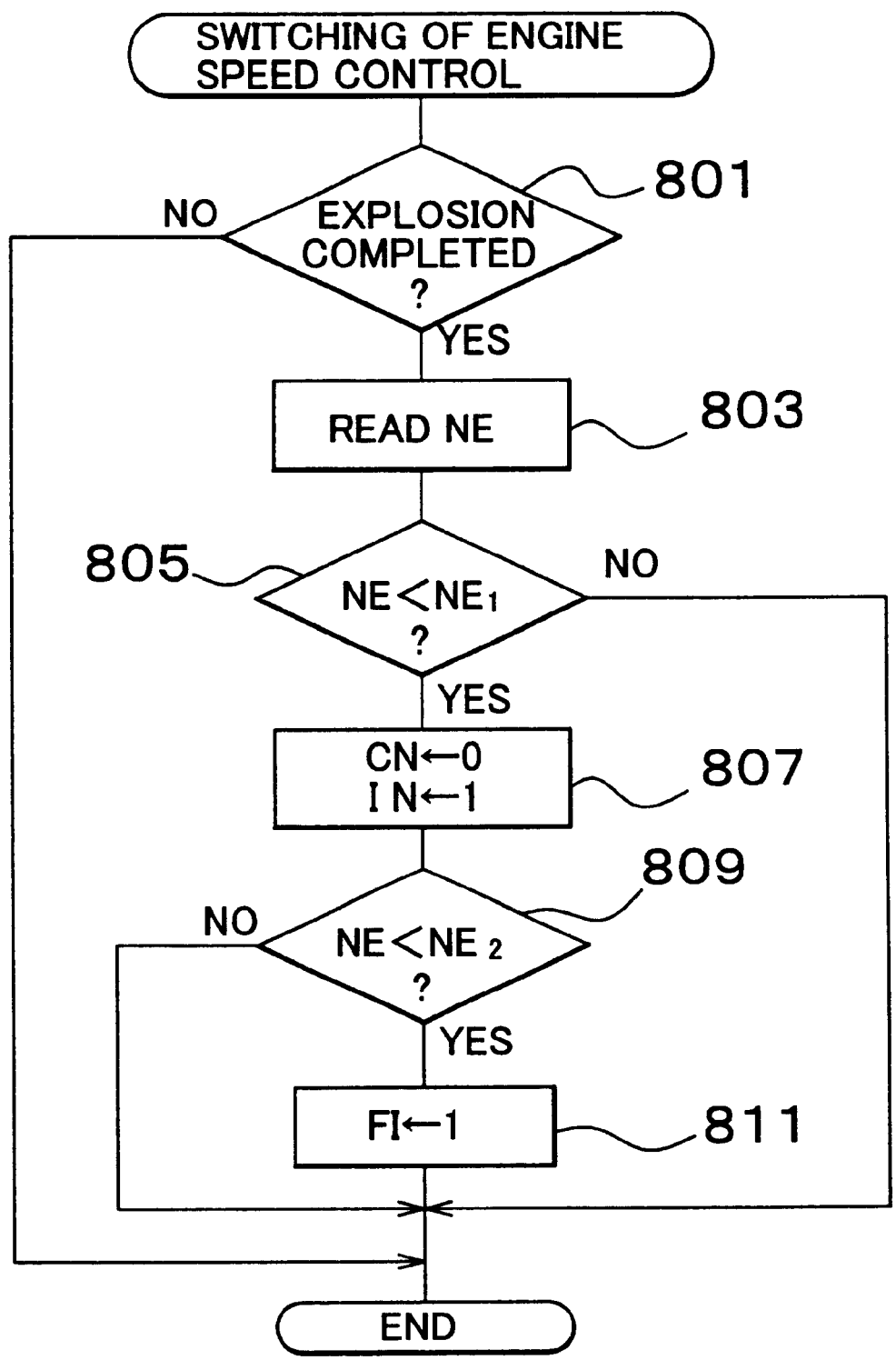
FIG. 8 is a flowchart illustrating a process of switching the engine speed control according to the second embodiment of the present invention.

FIG. 8 is a flowchart illustrating a process of switching the engine speed control according to the present embodiment. This control routine is executed by the ECU 10 at fixed time intervals. In the present embodiment, too, the process of determining deterioration in the combustion state based on the peak engine speed, and switching the engine speed control from the intake air flow control to the ignition timing control (for example, the switching control as described in the first embodiment or other similar control) is carried out in addition to the process of FIG. 8. As described above, if a heavy fuel is used and the fuel leaks from the fuel injection valve while the engine is stopped, the peak engine speed during starting of the engine becomes high. If deterioration of the combustion state is determined based on the peak engine speed, therefore, it is determined that the combustion state is not deteriorated. If the combustion state is actually deteriorated, the engine speed decreases to a greater extent after reaching the peak value, as compared to the case where the combustion state is not deteriorated. In the process shown in FIG. 8, if the engine speed decreases to a value lower than a first predetermined value after reaching the peak value, the ignition timing control is started regardless of the determination based on the peak engine speed as to whether the combustion state is deteriorated. If the deterioration in the combustion state could not be determined based on the peak engine speed during starting of the engine, switching to the ignition timing control is delayed, and the combustion state may be further deteriorated. In such a case, the engine speed cannot quickly be settled at the target value only by the ignition timing control, and therefore the exhaust properties of the engine may be kept degraded for a long time. Thus, in the process of FIG. 8, when the combustion state is deteriorated by a large degree, that is, when the engine speed is greatly reduced below a second predetermined value that is smaller than the first predetermined value, the fuel injection quantity is increased while the ignition timing control is performed, so as to increase the engine speed.

Hereinafter, the process as shown in FIG. 8 will be described. Step 801 is initially executed to determine whether the engine is already in a completely exploded state or not. For example, such determination can be made in a manner similar to that of step 401 of FIG. 4. More specifically, when a predetermined period of time has passed since an engine cranking operation was started, it is determined that the engine is in the completely exploded state. If step 801 determines that the engine has not reached the completely exploded state ("NO" in step 801), the process is immediately finished without conducting step 803 and subsequent steps. Step 803 and subsequent steps are executed only if the engine is in the completely exploded state.

In step 803, the engine speed NE is read. Step 805 is then executed to determine whether the engine speed NE is lower than a first predetermined value $NE_1$ or not. If NE is higher than $NE_1$ ("NO" in step 805), the engine is operated without significant reduction in the engine speed even after the peak value. Therefore, switching to the ignition timing control is not necessary, and the process is immediately terminated. Thus, where the intake air flow control has been performed, the same control continues to be performed without being switched to the ignition timing control.

If the engine speed NE is lower than the first predetermined value $NE_1$ in step 805 ("YES" in step 805), the combustion state is deteriorated, and therefore the ignition timing control must be immediately performed. Thus, the control flow goes to step 807 in which the intake air flow control flag CN is set to zero ("discontinue"), and the ignition timing control flag IN is set to 1 ("execute"), and the process is then finished. Thus, as described above in conjunction with FIGS. 6 and 7, the intake air flow control is discontinued, and the ignition timing control is started instead.

Following step 807, step 809 is executed to determine whether the engine speed NE is reduced to be lower than a second predetermined value $NE_2$ that is lower than the first predetermined value $NE_1$. If NE is equal to or higher than the second predetermined value $NE_2$ ("NO" in step 809), it is determined that the reduction in the engine speed caused by deterioration in the combustion state can be sufficiently restored by the ignition timing control. Therefore, the process is immediately terminated. If NE is lower than the second predetermined value $NE_2$ ("YES" in step 809), the engine speed has been reduced so much due to the poor combustion state that it is not likely to be controlled only by the ignition timing control. Therefore, the control flow goes to step 811 in which a fuel-quantity increasing flag FI is set to 1, and the present routine is immediately terminated.

When the fuel-quantity increasing flag FI is set to 1, the ECU 10 increases the fuel injection quantity by a predetermined value, thereby increasing the torque generated in each cylinder. Thus, the engine speed is quickly increased to the target value even when the combustion state has been significantly deteriorated. It is to be noted that the fuel-quantity increasing flag FI is initially set to zero.

As described above, according to the present embodiment, deterioration in the combustion state is surely determined even if the deterioration cannot be determined from the peak engine speed. As a result, the engine speed can be quickly settled at the target value.

In the present embodiment, the method of the first embodiment is used as the separately conducted process of switching the engine speed control based on the peak engine speed during starting of the engine. It is, however, to be understood that another method of controlling the engine speed based on the peak engine speed may be employed as the process of switching the engine speed control in the present embodiment.

While an electronic throttle valve that can be operated independently of the depression of the accelerator pedal by the driver is used for performing the intake air flow control in the illustrated embodiments, the present invention may be applied to a control apparatus that uses another means for performing the intake air flow control. It should be appreciated that the present invention can be applied to, for example, an engine having a so-called idle speed controller (ISC) that performs the intake air flow control by controlling, independently of an engine throttle valve, a control valve (ISC valve) provided in a bypass intake air passage for bypassing the throttle valve.

In each of the above-described embodiments, reduction in the engine speed caused by deterioration in the combustion state during starting of the engine can be effectively suppressed, and the engine speed can be accurately maintained at a target value. Moreover, degradation in the exhaust properties during starting of the engine can be minimized even if the engine operates in a poor combustion state.

When the engine speed during starting of the engine is controlled by the intake air flow control or the ignition timing control as described above, the timing of starting the engine speed control and a control parameter(s) upon start of the engine speed control must be set appropriately. More specifically, in controlling the engine speed, it is desirable to settle the engine speed at a target value corresponding to a fast idle speed as quickly as possible after the engine starting operation is started. However, depending on the timing of starting the control and the control parameter(s) upon start of the control, fluctuations in the engine speed may be increased, or the speed at which the engine speed follows the target value may be reduced, resulting in an increased time required for settling the engine speed at the target value. For example, after the engine starting operation is started, the engine speed generally cannot be controlled until the engine speed reaches the peak value, as described later. Therefore, if the engine speed control is started simultaneously with the start of the engine starting operation, the engine speed cannot be accurately controlled. Furthermore, feedback corrections of the intake air flow rate and the ignition timing are set to excessively large values by the engine speed control, and fluctuations in the engine speed may be increased when the engine speed control can be appropriately performed. Moreover, if the actual engine speed is close to the target value upon start of the engine speed control, an overshoot and/or undershoot of the engine speed may result if a control parameter, such as a feedback control gain, is set to a large value. Accordingly, settlement or convergence of the engine speed at the target value may be delayed.

The engine speed control of the present invention as described below makes it possible to smoothly and quickly settle the engine speed at the target value by appropriately setting the timing of starting the control, the control parameter(s) for use in the engine speed control upon start of the control, and others.

Hereinafter, some examples of the engine speed control according to the present invention will be described.

(3) Third Embodiment

In the present embodiment, the engine speed control is started at a point of time when the volume of the intake air that has been introduced into the engine since the start of the engine starting operation (cranking) becomes equal to the volume of the intake air passage downstream of the throttle valve, so that the timing of starting the engine speed control is appropriately set, and the engine speed can be quickly and smoothly settled at the target value.

Figure 9:
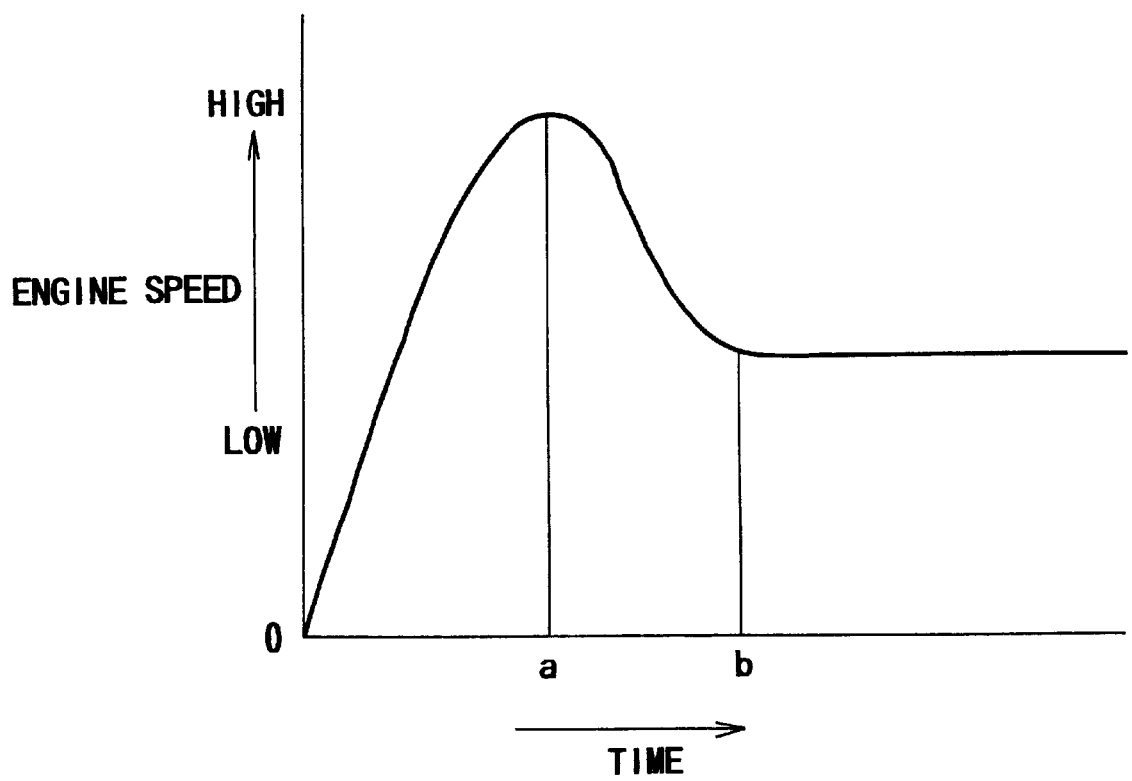
FIG. 9 is a graph showing changes in the engine speed with time during starting of the engine.

FIG. 9 is a graph showing changes in the engine speed with time in the case where the engine is started with the opening of the throttle valve 16 being fixed. As shown in FIG. 9, the engine speed increases after the cranking is started, and rapidly increases until it reaches the peak value (point "a" in FIG. 9) when explosion occurs in all cylinders. Thereafter, the engine speed is reduced down to the idle speed (point "b").

In FIG. 9, the engine speed rapidly increases to the peak value upon the start of the engine, though the opening of the throttle valve 16 is fixed. The reason for this is as follows: while the engine is stopped, a pressure in the intake air passage downstream of the throttle valve 16 is equal to the atmospheric pressure, and a relatively large quantity of the air is stored in the intake air passage between the throttle valve 16 and each cylinder. When the engine starts rotating, the air stored downstream of the throttle valve 16 is immediately introduced into the cylinders. Accordingly, upon the start of the engine starting operation, a large quantity of the air is introduced into the cylinders as if the throttle valve were fully opened, and the engine speed rapidly increases upon complete explosion of the engine. However, after the air retained downstream of the throttle valve 16 is entirely introduced into the cylinders, only such a quantity of the air that corresponds to the throttle opening is supplied to the cylinders, whereby the engine speed is reduced. Thus, after the start of the engine starting operation, the engine speed rapidly increases for a moment to provide a peak engine speed during starting of the engine.

As described above, it is desirable to start the engine speed control as early as possible in order to quickly settle the engine speed at the target value. It is, however, difficult to control the engine speed by either one of the intake air flow control and the ignition timing control, during a certain period in which the air retained downstream of the throttle valve is introduced into the cylinders as if the throttle valve were fully opened. If the engine speed control is started during this period, the intake air flow rate is significantly reduced in the intake air flow control, or the ignition timing is significantly retarded in the ignition timing control, in order to reduce the engine speed. As a result, the engine speed decreases far below the target value after reaching the peak value, whereby settlement at the target value is delayed.

In the present embodiment, the above-mentioned problem is solved as follows: the quantity of the air introduced into the engine after the start of the engine starting operation is integrated. Then, the engine speed control is started when the integrated value reaches the volume of the intake air passage downstream of the throttle valve. More specifically, it is possible to control the engine speed after the air retained in the intake air passage downstream of the throttle valve is entirely introduced into the engine upon the start of the engine starting operation. Thus, in the present embodiment, it is determined from the integrated value of the intake air quantity that the same quantity of the air as that retained downstream of the throttle valve has been introduced into the engine, and the engine speed control is started from this point of time. Since the engine speed control is started as soon as it becomes possible after the engine starting operation is started, the engine speed can be quickly settled at the target value.

Figure 10:
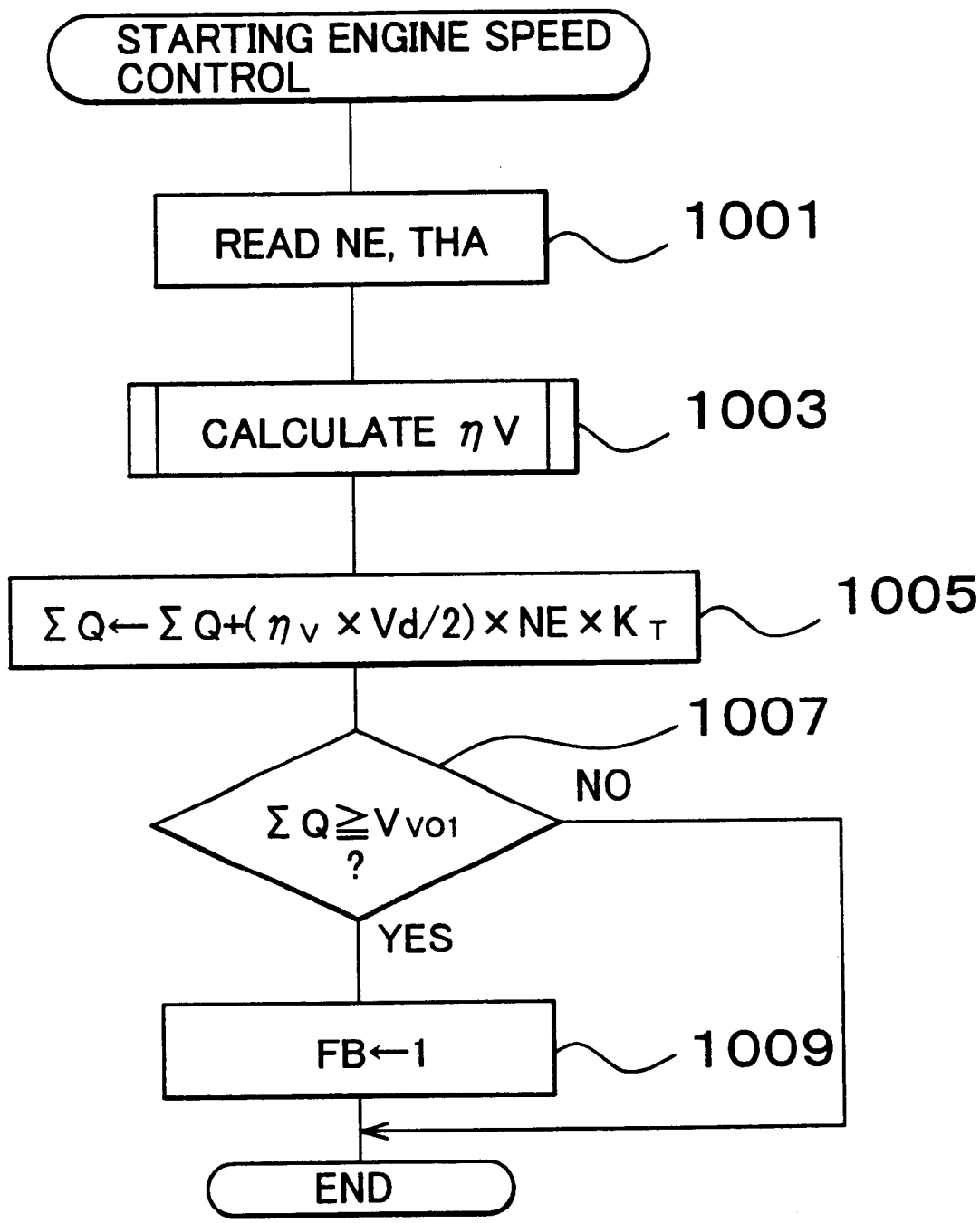
FIG. 10 is a flowchart illustrating one example of a process of starting the engine speed control during starting of the engine.

FIG. 10 is a flowchart illustrating a routine of starting the engine speed control according to the present embodiment. This control routine is executed by the ECU 10 at regular time intervals.

Upon the start of the process of FIG. 10, an engine speed NE and a throttle opening THA detected by the respective sensors 6 and 17 are read in step 1001. Then, in step 1003, a current volumetric efficiency $\eta v$ of the intake air is calculated based on the values NE and THA. The volumetric efficiency $\eta v$ is the ratio of the quantity of the air actually introduced into the engine, to the total displacement of the engine, and is a function of the throttle opening THA and the engine speed NE. In the present embodiment, the intake air quantity was actually measured in advance by actually operating the engine while varying the throttle opening and the engine speed. Thus, the relationship between the volumetric efficiency $\eta v$ and the values THA and NE are obtained in advance. The values of $\eta v$ are stored in the ROM 104 of the ECU 10 as a numerical table of THA and NE. In step 1003, a value of the volumetric efficiency $\eta v$ is read from the numerical table based on the throttle opening THA and the engine speed NE.

Then, in step 1005, an integrated value of the quantity (volume) of the air actually introduced into the engine is increased by $(\eta v \times Vd/2) \times NE \times K_T$ where $\eta v$ is the volumetric efficiency of the intake air calculated in step 1003, Vd is the displacement of the engine, NE is the engine speed (RPM), $K_T$ is a constant given by $K_T = \Delta T/60$, and $\Delta T$ is an interval (sec.) at which this control routine is executed. Since the engine 1 of the present embodiment is a four-cycle engine, the intake air quantity introduced per revolution of the engine is expressed as $(\eta v \times Vd/2)$. $NE \times K_T$ indicates the number of revolutions of the engine that take place between the last cycle and the current cycle. Accordingly, $(\eta v \times Vd/2) \times NE \times K_T$ represents the intake air quantity (volume) introduced into the engine after execution of the last cycle of the present routine. Since the value of $\Sigma Q$ is initially set to zero, $\Sigma Q$ accurately represents the integrated value of the quantity of the intake air introduced into the engine up to the present, by executing step 1005 at regular intervals ($\Delta T$).

After the integrated value $\Sigma Q$ is calculated as described above, step S1007 is executed to determine whether the current integrated value $\Sigma Q$ has reached a predetermined value $V_{VO1}$ or not, where $V_{VO1}$ is the total volume of the intake air passage downstream of the throttle valve 16. If $\Sigma Q < V_{VO1}$ in step 1007 ("NO" in step 1007), the air retained downstream of the throttle valve 16 has not been completely introduced into the engine, and accurate control of the engine speed cannot be performed. Therefore, the process is immediately terminated. If $\Sigma Q \geq V_{VO1}$ ("YES" in step 1007), the air retained downstream of the throttle valve 16 has been completely introduced into the engine, and accurate control of the engine speed can be conducted. Therefore, the control flow goes to step 1009 in which an engine speed control flag FB is set to 1, and the process is finished.

When the flag FB is set to 1, the intake air flow control and ignition timing control described above are allowed to be executed by a routine that is separately executed by the ECU 10. Thus, the intake air flow control, or the ignition timing control if the engine operates in a poor combustion state, is performed.

(4) Forth Embodiment

Hereinafter, another example of the process of starting the engine speed control during starting of the engine according to the present invention will be described. The present embodiment (forth embodiment) is similar to the third embodiment in that the engine speed control is started as soon as such control becomes possible, so that the engine speed is quickly settled at the target value. However, the third and fourth embodiments are different from each other in that the timing of starting the control is determined based on the intake air quantity in the third embodiment, whereas such timing is determined based on the engine speed in the fourth embodiment.

As described above, after the engine starting operation is started, the engine speed is increased regardless of the throttle opening while the air retained downstream of the throttle valve is being introduced into the engine. After the retained air is completely introduced into the engine, the engine speed is reduced to a value corresponding to the throttle opening. Therefore, the point at which the engine speed starts decreasing, i.e., the point at which the engine speed reaches the peak value as described above in conjunction with FIG. 9, can be considered as the point at which the air retained downstream of the throttle valve is completely introduced into the engine.

In the present embodiment, the engine speed is monitored after the engine starting operation is started, whereby the engine speed control is started at the time when it is determined that the engine speed has reached the peak value.

Figure 11:
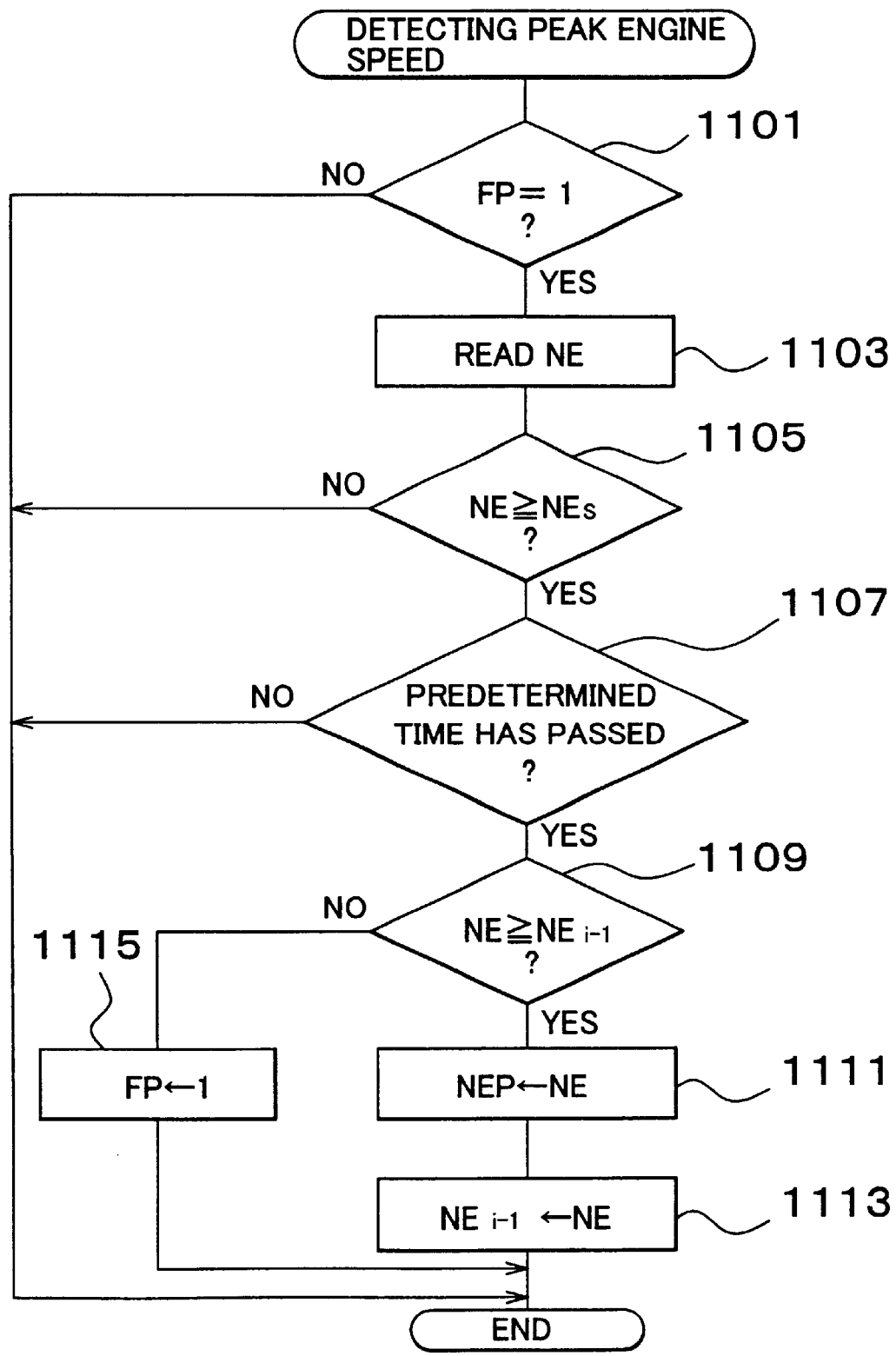
FIG. 11 is a flowchart illustrating a process of detecting a peak engine speed during starting of the engine.
Figure 12:
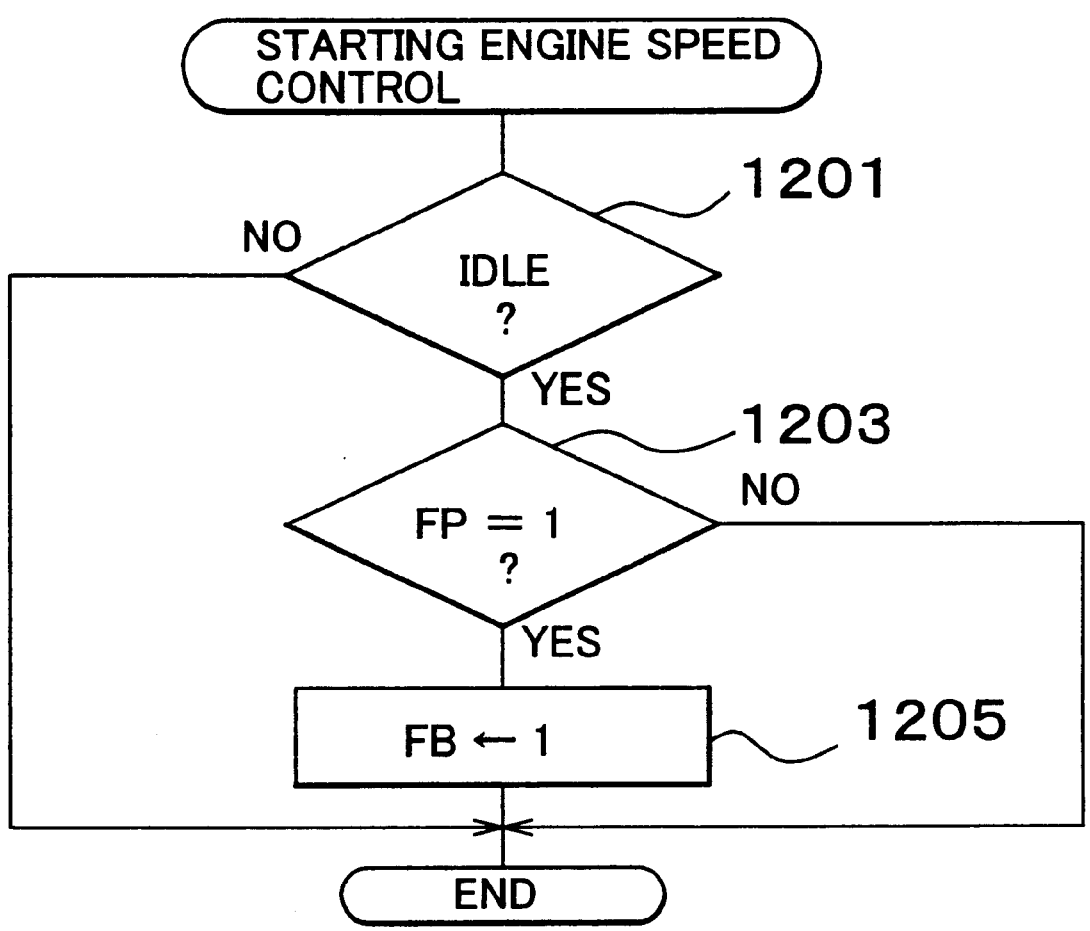
FIG. 12 is a flowchart illustrating a process of starting the engine speed control during starting of the engine.

FIGS. 11 and 12 are flowcharts illustrating the process of starting the engine speed control according to the present embodiment. More specifically, FIG. 11 is a flowchart illustrating a process of detecting that the engine speed has reached the peak value after the engine starting operation is started. FIG. 12 is a flowchart illustrating a process of starting the engine speed control during starting of the engine based on whether the engine speed has reached the peak value or not. The control routines of FIGS. 11 and 12 are executed by the ECU 10 at regular time intervals.

In the process of FIG. 11, whether a peak detection flag FP has been set to 1 or not is determined in step 1101. The peak detection flag FP, which is initially set to zero, is set to 1 in step 1115 when the engine speed has reached the peak value.

If the peak detection flag FP has been set to 1 in step 1101, the peak detection is no longer necessary. Therefore, the process is terminated without executing step 1103 and subsequent steps.

If FP≠1 in step 1101, that is, if the peak detection has not been completed, a current engine speed NE is read in step 1103. Steps 1105 and 1107 are then executed to determine whether conditions for the peak detection are satisfied or not. In the present embodiment, the peak detection is conducted only if the engine speed NE is equal to or higher than a predetermined value NEs (step 1105) and a predetermined period of time has passed since the engine starting operation was started (step 1107). These conditions are provided for preventing erroneous detection of the peak engine speed. More specifically, before the engine is placed in a completely exploded state, the combustion state is unstable, and the engine speed non-uniformly increases with fluctuations, thereby possibly producing a small peak. In the present embodiment, in order to prevent such a small peak from being detected as the peak value, the peak detection is started only if the engine speed is equal to or higher than the predetermined value NEs (NEs is an engine speed at which it is determined that the engine is in the completely exploded state) and the predetermined period of time (e.g., 1,000 ms) has passed since the engine starting operation was started. If one or both of steps 1105 and 1107 is/are not satisfied, the process is immediately terminated without executing step 1109 and subsequent steps.

If the conditions of steps 1105 and 1107 are satisfied, the control flow goes to step 1109 in which an engine speed $NE_{i-1}$ of the previous control cycle and a current engine speed NE read in step 1103 are compared. If $NE \geq NE_{i-1}$ in step 1109, that is, if the engine speed is increasing, the peak engine speed NEP is replaced by the current engine speed NE (step 1111). Moreover, $NE_{i-1}$ is updated for the next cycle, and the present cycle is finished.

If $NE < NE_{i-1}$ in step 1109, that is, if the engine speed starts decreasing from the peak value, the control flow goes to step 1115 in which the peak detection flag FP is set to 1, and the process is terminated. Thus, as long as the engine speed continues to increase, the peak engine speed NEP is updated by a current engine speed. When the engine speed starts decreasing, however, the peak engine speed NEP is no longer updated. Thus, the peak engine speed is set as NEP. Once the peak engine speed is detected, the peak detection flag 1 is set to 1. Accordingly, the peak detection is no longer conducted from the next cycle (step 1101).

In the process of FIG. 12, step 1201 is initially executed to determine whether the engine is in an idle state or not. This is determined depending upon whether the throttle opening THA is set to a predetermined value for the idle state or not. If the engine is in the idle state ("YES" in step 1201), step 1203 is executed to determine whether the peak detection flag FP that is set in the process of FIG. 11 is 1 ("detected") or not. If FP=1 ("YES" in step 1203), it means that the engine speed has reached the peak value. Therefore, the control flow goes to step 1205 in which the engine speed control flag FB is set to 1, and the process is terminated. Thus, the intake air flow control (or the ignition timing control) is carried out as in the case of the third embodiment. If FP≠1 ("NO" in step 1203), the engine speed has not reached the peak value. Since it is not the time to start the engine speed control, the process is terminated without changing the engine speed control flag FB.

If the engine is not in the idle state in step 1201, that is, if the vehicle is running, the engine speed control need not be started. Therefore, the process is immediately terminated.

According to the present embodiment, the timing of starting the engine speed control can be easily determined without calculating an integrated value of the intake air quantity.

(5) Fifth Embodiment

Hereinafter, the fifth embodiment of the present invention will be described.

The fifth embodiment is similar to the fourth embodiment in that the engine speed control is started at the time when the engine speed has reached a peak value during starting of the engine. In the fifth embodiment, however, a target engine speed is first set to an actual peak value when the engine speed control is started. Then, the target engine speed is gradually varied over time to be equal to a final target value (fast idle speed).

If the engine speed control is started at the time when the engine speed has reached the peak value, the engine speed at the beginning of the control is much higher than the fast idle speed. Therefore, if the fast idle speed is set as the target value from the beginning of the control, the engine speed control is performed so as to reduce the actual engine speed. However, the engine speed spontaneously decreases after reaching the peak value. Therefore, if the engine speed is controlled to decrease significantly during such a spontaneously decreasing period, the engine speed is reduced far below the fast idle speed, and it may take a long time to settle the engine speed at the final target value, i.e., the fast idle speed. In the present embodiment, therefore, the target engine speed is first set to an actual peak engine speed upon the start of the engine speed control when the engine speed reaches the peak value, and is then gradually reduced to the final target engine speed, i.e., the fast idle speed. Thus, since the actual engine speed does not significantly deviate from the target engine speed even after the engine speed reaches the peak value, the engine speed is not controlled to decrease to a large extent, so that the engine speed can be quickly settled at the target value after the control is started.

Moreover, in the present embodiment, when the engine speed that is decreasing from the peak value falls within a predetermined range from the fast idle speed, that is, when the engine speed that is decreasing from the peak value gets close to the final target value, an operation of reducing the target value at a lower rate is conducted. Thus, by reducing the target value at a lower rate near the final target value, an undershoot of the engine speed is further suppressed.

Figure 13:
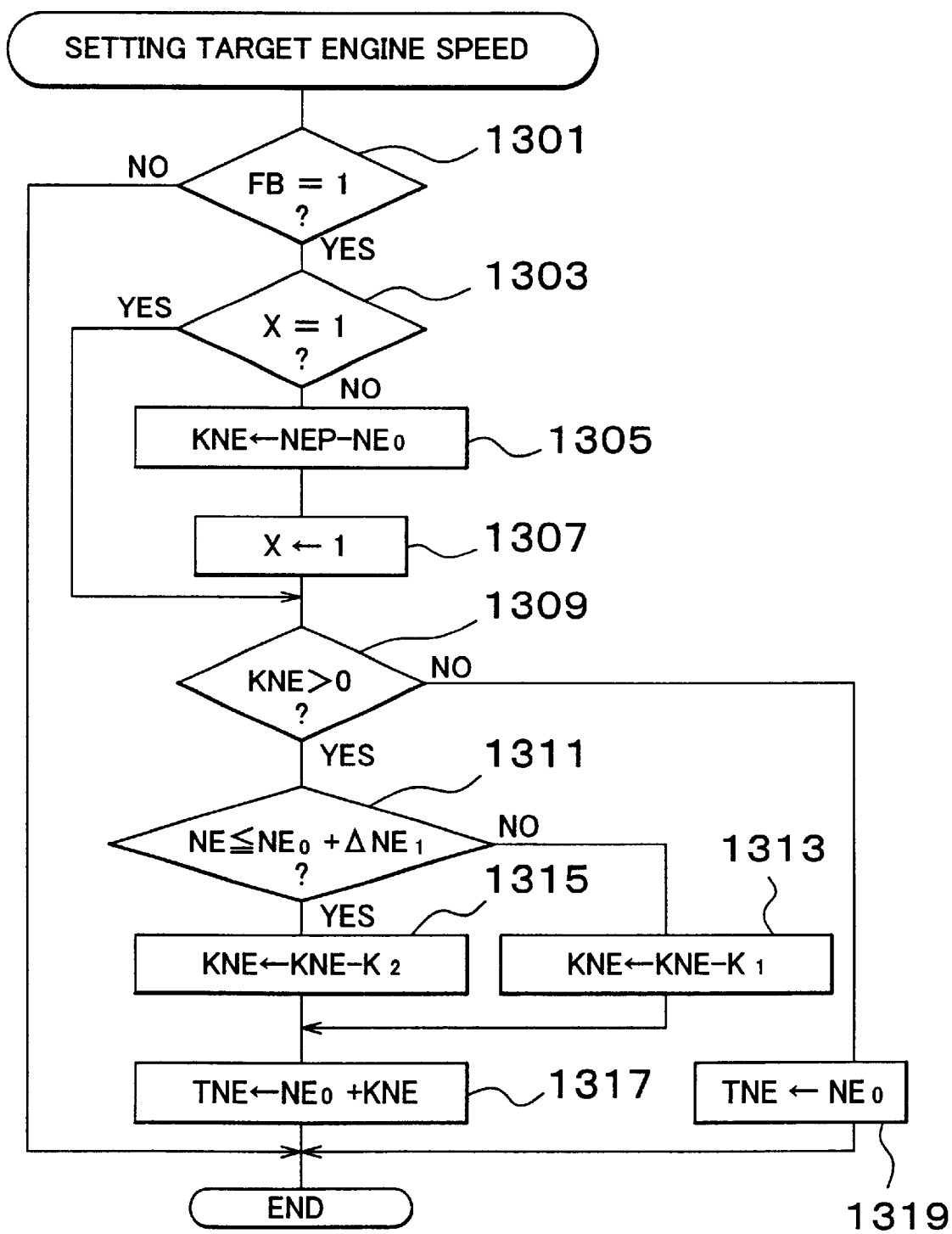
FIG. 13 is a flowchart illustrating one example of a process of setting a target engine speed in the engine speed control.

FIG. 13 is a flowchart specifically illustrating a process of setting the target engine speed according to the present embodiment. The control routine of FIG. 13 is executed by the ECU 10 at regular time intervals.

When the process of FIG. 13 is started, whether the engine speed control flag FB has been set to 1 or not is determined in step 1301. If FB≠1 ("NO" in step 1301), the process is immediately terminated without executing step 1303 and subsequent steps.

If FB=1 in step 1301 ("YES" in step 1301), step 1303 is executed to determine whether or not the current control cycle is the first cycle to be executed after the flag FB is changed from zero to 1 is determined in step 1303. Step 1305 is executed only if the current control cycle is the first cycle to be executed after the flag FB was changed from zero to 1. In step 1305, an initial value of a variable KNE is set as described below.

In the present embodiment, too, the processes as shown in FIGS. 11 and 12 are carried out independently of the process of FIG. 13, and the engine speed control flag FB is set to 1 as soon as the engine speed reaches the peak engine speed. Moreover, a flag X of steps 1303 and 1307 is used to execute step 1305 only once immediately after the flag FB is changed from zero to 1.

In step 1305, the initial value of KNE is set as KNE=NEP−NE$_0$. NEP, which is set in the process of FIG. 11, is an actual peak engine speed during current starting of the engine. NE$_0$ is a final target engine speed (fast idle speed) of the engine speed control. As described below, in the present embodiment, a target engine speed of the engine speed control is set as TNE=NE$_0$+KNE. KNE is reduced with time from the above-mentioned initial value.

Steps 1313 and 1315 are the operations of reducing KNE. In the present embodiment, the rate at which KNE is reduced is changed depending upon whether the actual engine speed NE has got sufficiently close to the final target value NE$_0$ or not, that is, whether NE is equal to or smaller than NE$_0$+ΔNE$_1$ or not. Whether NE≦NE$_0$+ΔNE$_1$ or not is determined in step 1311. If NE>NE$_0$+ΔNE$_1$ (i.e., if the actual engine speed has not been sufficiently close to the final target value), KNE is reduced by a relatively large fixed value K$_1$ each time the process is carried out (step 1313). Thus, KNE is reduced with time at a relatively high rate. If NE≦NE$_0$+ΔNE$_1$ in step 1311 (i.e., if the actual engine speed has got sufficiently close to the final target value), KNE is reduced by a relatively small fixed value K$_2$ (K$_2$<K$_1$) each time the process is carried out (step 1315). Thus, after the control is started, KNE is reduced with time at a relatively high rate until the engine speed gets close to the final target value, and is reduced at a relatively low rate thereafter. In the present embodiment, ΔNE$_1$ is set to a fixed value, for example, about 100 RPM.

Then, in step 1317, the target engine speed TNE used in the engine speed control is set as TNE=NE$_0$+KNE. In the case where KNE is reduced to a negative value, TNE is set to the final target value NE$_0$ (steps 1309, 1319).

According to the process of FIG. 13, the target engine speed TNE is set to an actual peak value NEP upon the start of the engine speed control when the engine speed reaches the peak value (steps 1305, 1317). Thereafter, TNE is reduced with time at a relatively high rate until the actual engine speed gets close to the final target value (steps 1311, 1313), and is then reduced at a relatively low rate in a region where the actual engine speed is close to the final target value NE$_0$ (step 1315). Thus, TNE is finally set to the final target value NE$_0$ (steps 1309, 1319).

While the control routine of FIG. 13 is executed by the ECU 10 at regular time intervals, the control routine of FIG. 13 may be executed each time the crankshaft of the engine revolves a certain angle of rotation. In this case, the rate of reduction of the target engine speed is additionally varied according to the engine speed, and thus the control response can further be improved.

In the present embodiment, the target engine speed is gradually changed from the actual peak value to the final target value. Therefore, the actual engine speed does not largely deviate from the target engine speed even if variations arise in the actual peak engine speed. As a result, the engine speed can be quickly settled at the final target value. Moreover, in the present embodiment, the rate of change in the target engine speed is set to a low value when the actual engine speed gets close to the final target value. Therefore, an undershoot of the engine speed is prevented, whereby the time to settle at the final target value is further reduced.

(6) Sixth Embodiment

Hereinafter, the sixth embodiment of the present invention will be described.

In the third through fifth embodiments, the engine speed control is started when the engine speed gets close to the peak value after the engine starting operation is started. Upon the start of the engine speed control, therefore, the actual engine speed is higher than the target value (e.g., the fast idle speed). Accordingly, when the engine speed control is started, the intake air flow rate or ignition timing is corrected so that the engine speed is reduced. In fact, during starting of the engine, the engine speed rapidly decreases after reaching the peak value. Therefore, if the engine speed control is started during such a rapid decrease in the engine speed from the peak value, the engine speed decreases to an excessively large extent, whereby settlement at the target value may be delayed.

In the present embodiment, therefore, the rate of change in the engine speed after the start of the engine starting operation is detected. Then, the engine speed control is started when the rate of change becomes equal to or less than a predetermined values, so that the engine speed is quickly settled at the target value.

Figure 14:
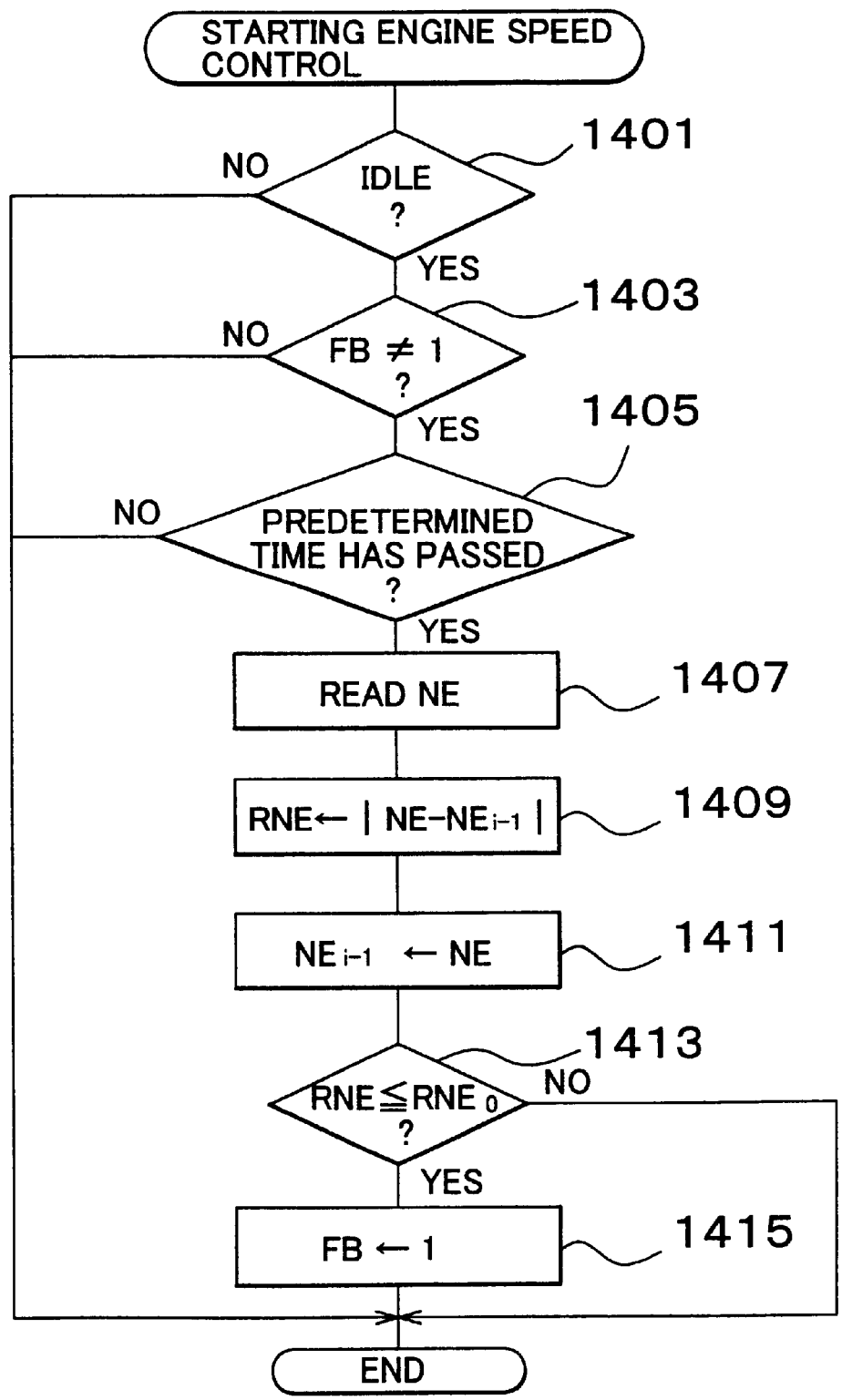
FIG. 14 is a flowchart illustrating another example of the process of starting the engine speed control during starting of the engine.

FIG. 14 is a flowchart illustrating a routine of starting the engine speed control during starting of the engine according to the present embodiment. This routine is executed by the ECU 10 at regular time intervals.

Steps 1401 to 1405 of FIG. 14 are the steps of determining whether conditions for starting the engine speed control are satisfied or not. More specifically, in step 1401, whether the engine is in an idle state or not is determined based on the opening of the throttle valve 16. In step 1403, whether the engine speed control has already been started or not is determined based on the engine speed control flag FB. In step 1405, whether a predetermined period of time (e.g., about 2,000 ms) has passed from the start of the engine operation (cranking) is determined. If the engine is not in the idle state in step 1401 ("NO" in step 1401), or if the engine speed control has already been started (FB=1) in step 1403 ("NO" in step 1403), the engine speed control need not be started. Therefore, the process is immediately terminated without executing step 1407 and subsequent steps. If the predetermined period of time has not passed in step 1405 ("NO" in step 1405), the engine speed may not have reached the peak value. In this case as well, the process is terminated without executing step 1407 and subsequent steps, in order to avoid detecting reduction in the rate of change in the engine speed that occurs in the vicinity of the peak value.

If all the conditions of steps 1401 to 1403 are satisfied, a current engine speed NE is read in step 1407, and a rate of change RNE in the engine speed from the engine speed $NE_{i-1}$ of the previous control cycle to the current engine speed NE is calculated as $RNE = INE - NE_{i-1}$ in step 1409.

After $NE_{i-1}$ is updated for the next RNE calculation in step 1411, the control flow goes to step 1413.

In step 1413, it is determined whether the rate of change RNE calculated in step 1409 is equal to or smaller than a predetermined value $RNE_0$ (i.e., whether $RNE \leq RNE_0$ or not). If $RNE \leq RNE_0$ ("YES" in step 1413), the engine speed control flag FB is set to 1 in step 1415. Thus, in the present embodiment, the engine speed control is started when the rate of change in engine speed is reduced, so that the engine speed can be settled at the target value in a short period of time.

(7) Seventh Embodiment

Hereinafter, the seventh embodiment of the present invention will be described.

In the present embodiment, after the engine starting operation is started, the engine speed control is started when the engine speed passes a target value while decreasing from the peak value.

As described above, the engine speed rapidly decreases after the peak value. Therefore, if the engine speed control is started while the engine speed decreasing from the peak value is still higher than the target value, the engine speed is further reduced under the engine speed control irrespective of the fact that the engine speed is actually decreasing. As a result, the engine speed may be reduced to an excessively large extent.

In the present embodiment, the engine speed control is started when the engine speed decreasing from the peak value passes the target value (fast idle speed). In other words, the engine speed control is started at a point of time when the actual engine speed becomes equal to the target value. As a result, excessive reduction in the engine speed is prevented. More specifically, in the present embodiment, the difference between the actual and target engine speeds is considerably small when the engine speed control is started, and therefore the actual engine speed is not significantly reduced by the engine speed control. Thus, excessive reduction in the engine speed upon start of the control is prevented, and the engine speed can be settled at the target value in a short period of time.

Figure 15:
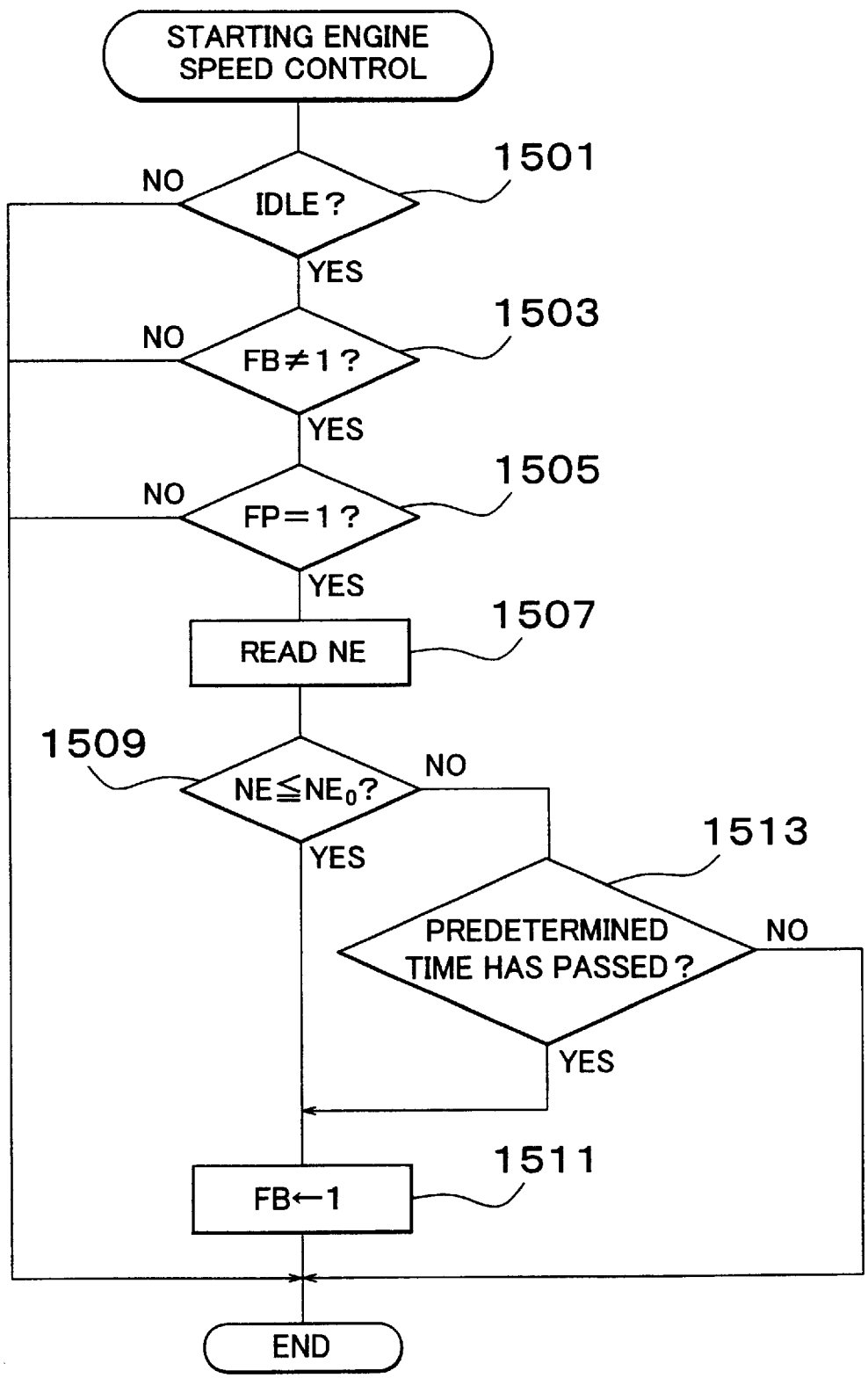
FIG. 15 is a flowchart illustrating a further example of the process of starting the engine speed control during starting of the engine.

FIG. 15 is a flowchart illustrating a routine of starting the engine speed control according to the present embodiment.

This routine is executed by the ECU 10 at regular time intervals. Steps 1501 and 1503 of FIG. 15 determine whether conditions for starting the engine speed control are satisfied or not, as in steps 1401 and 1403 of FIG. 14. Step 1505 determines whether a current engine speed has passed the peak value or not. "FP" denotes a peak detection flag that is set in a process similar to that of FIG. 11, which is executed separately by the ECU 10. If $FP \neq 1$ in step 1505, that is, if the engine speed has not reached the peak value, the process is terminated without executing step 1507 and subsequent steps. Thus, the engine speed control is prevented from being started when the engine speed becomes equal to the target value while increasing toward the peak value.

If it is determined in step 1505 that the engine speed has already reached the peak value ("YES" in step 1505), the engine speed NE is read in step 1507. Step 1509 is then executed to determine whether or not the engine speed NE has decreased to a value equal to or lower than a target value $NE_0$ (i.e., whether $NE \leq NE_0$). If $NE \leq NE_0$ ("YES" in step 1509), the engine speed control flag FB is set to 1 in step 1511, and the process is terminated. Thus, the engine speed control is started when the engine speed has decreased from the peak value to the target value.

If it is determined in step 1509 that the engine speed NE has not decreased to the target value $NE_0$ ("NO" in step 1509), the control flow goes to step 1513. Step 1513 determines whether or not a predetermined period of time (e.g., about 3,000 ms) has elapsed from the start of the engine starting operation. If the predetermined time period has elapsed ("YES" in step 1513), the control flow goes to step 1511 to start the engine speed control even if the engine speed has not decreased to the target value $NE_0$. This is because, if the engine speed decreases from the peak value at a relatively low rate, it takes a relatively long time for the engine speed to be reduced down to the target value. In such a case, the engine speed control is started without waiting for the engine speed to be reduced to the target value, in order to settle the engine speed at the target value in a short period of time. In this case, since the engine speed decreases at a relatively low rate, as described above, no significant reduction in the engine speed occurs even if the engine speed control is started before the engine speed is lowered to the target value.

(8) Eighth Embodiment

Hereinafter, the eighth embodiment of the present invention will be described.

In the present embodiment, when the engine speed control is switched from he intake air flow control to the ignition timing control in response to a poor combustion state of the engine, the ignition timing control is started with the ignition timing being advanced stepwise by a predetermined amount. In general, if the engine operations in a poor combustion state, the engine speed is reduced to a large extent after it reaches the peak value. At the point of time when the switching from the intake air flow control to the ignition timing control is conducted in response to the poor combustion state, therefore, the engine speed has been reduced to be lower than the target value. Accordingly, the engine speed must be quickly increased after the engine speed control is switched to the ignition timing control.

According to the present invention, when the engine speed control is switched to the ignition timing control, the ignition timing control is started with the ignition timing being advanced by a predetermined amount, relative to the ignition timing before the switching. As a result, the engine speed is increased as soon as the ignition timing control is started, and the engine speed quickly reaches the target value.

Hereinafter, the process of switching the engine speed control in response to a poor combustion state of the engine, as well as the process of controlling the engine speed by controlling the intake air flow control or the ignition timing control, will be specifically described with reference to FIGS. 16 to 19.

In the present embodiment, whether the combustion state has been deteriorated or not is determined by comparing the peak engine speed NEP detected in the process of FIG. 11 with the predetermined reference peak engine speed $NEP_0$. When the combustion state is deteriorated, the peak engine speed NEP is reduced according to the degree of deterioration. For example, a suitable reference peak engine speed $NEP_0$ (fixed value) is set in advance, and the difference DNP between the reference peak engine speed $NEP_0$ and the actual peak engine speed NEP is calculated ($DNP=NEP_0-NEP$). In this case, DNP is increased as the degree of deterioration of the combustion state is increased. Thus, the degree of deterioration of the combustion state can be expressed by using DNP.

In the present embodiment, when the engine speed control is started, the intake air flow control is first performed, and whether the combustion state has been deteriorated or not is determined based on the difference DNP between the above peak engine speeds. Then, the timing of switching from the intake air flow control to the ignition timing control is set according to the degree of deterioration of the combustion state.

Figure 16:
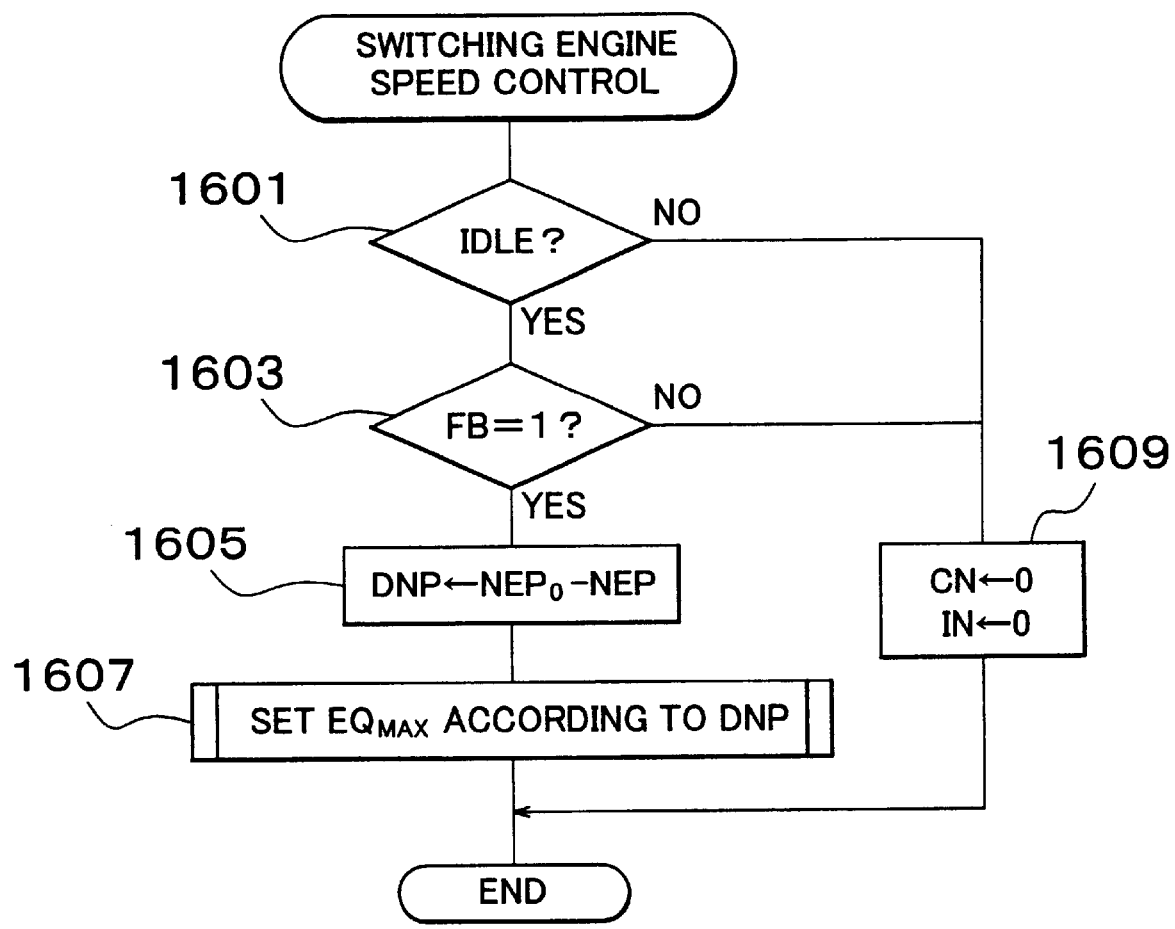
FIG. 16 is a flowchart illustrating a process of switching from the intake air flow control to the ignition timing control.

FIG. 16 is a flowchart illustrating a routine of controlling the engine speed during starting of the engine according to the present embodiment. This control routine is executed by the ECU 10 at regular time intervals.

When the process of FIG. 16 is started, whether the engine is in an idle state or not is determined in step 1601. In addition, whether the engine speed control flag FB has been set to 1 or not is determined in step 1603.

If the engine is in the idle state and the flag FB is 1 ("execute"), the control flow goes to step 1605 in which the difference DNP between the predetermined reference peak engine speed $NEP_0$ and the peak engine speed NEP detected in the process of FIG. 11 is calculated. Then, in step 1607, the upper limit $EQ_{MAX}$ of the feedback correction EQ of the intake air flow control is set according to the calculated value $DNP_1$ and the process is finished.

If one of steps 1601 and 1603 is not satisfied, the control flow goes to step 1609 in which the intake air flow control flag CN and the ignition timing control flag IN are both set to zero, and the process is finished.

In the present embodiment, the intake air flow control as described below is performed when the flag CN is set to 1, whereas the ignition timing control is performed when the flag IN is set to 1. It is to be noted that the flag CN is initially set to 1 ("execute"). When the flag FB is set to 1 during the idling operation (steps 1601, 1603), therefore, the intake air flow control is first started.

Figure 17:
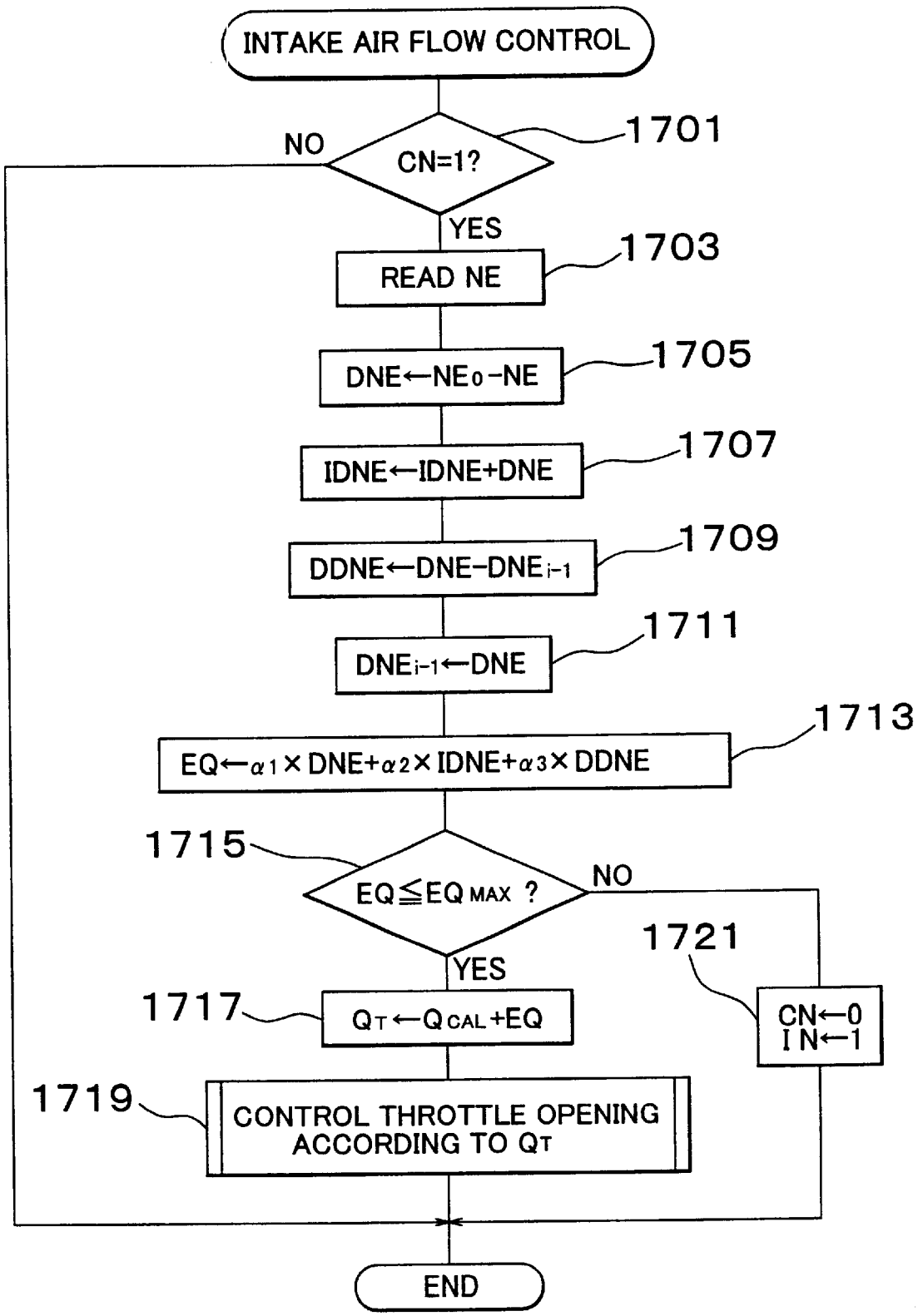
FIG. 17 is a flowchart illustrating one example of a process of the intake air flow control.

FIG. 17 is a flowchart illustrating a process of the intake air flow control. In this process, the feedback correction EQ of the intake air flow rate is set based on the difference DNE between the target engine speed $NE_1$ and the actual engine speed NE. When the feedback correction EQ reaches the upper limit $EQ_{MAX}$, switching from the intake air flow control to the ignition timing control is conducted.

More specifically, in step 1701, whether the intake air flow control flag CN is 1 ("execute") or not is determined. If CN=1 ("YES" in step 1701), DNE is calculated in steps 1703 and 1705. In the next step 1707, an integral value IDNE of the deviation DNE is calculated. In step 1709, a differential value DDNE of the deviation DNE is calculated as $DDNE=DNE-DNE_{i-1}$. $DNE_{i-1}$ is a value DNE of the previous process cycle. In step 1711, $DNE_{i-1}$ is updated each time the process is executed.

Then, in step 1713, the feedback correction EQ of the intake air flow rate is calculated using the equation: $EQ=\Delta_1 \times DNE+\alpha_2 \times IDNE+\alpha_3 \times DDNE$. In other words, the feedback correction EQ is set according to the proportional differential and integral control based on the difference DNE between the target and actual engine speeds.

After the feedback correction EQ is set as described above, whether or not the feedback correction EQ has reached the upper limit $EQ_{MAX}$ set in the process of FIG. 16 is determined in step 1715. If the feedback correction EQ has not reached the upper limit $EQ_{MAX}$, the control flow goes to step 1717 in which a target value $Q_T$ of the intake air flow rate of the engine is calculated using the equation $Q_T=Q_{CAL}+EQ$ where $Q_{CAL}$ is a target intake air flow rate that is determined based on the engine speed and the amount of depression of the accelerator pedal by the driver. In step 1719, the opening of the throttle valve 16 is controlled according to the resultant target intake air flow rate $Q_T$.

If the feedback correction EQ has reached the upper limit $EQ_{MAX}$ in step 1715, the control flow goes to step 1721 in which the intake air flow control flag CN is set to zero ("discontinue"), and the ignition timing control flag IN is set to 1 =("execute"). Thus, in the next and subsequent cycles, the intake air flow control is discontinued (step 1701), and the ignition timing control as described below is started. In other words, switching from the intake air flow control to the ignition timing control is conducted.

In the present embodiment, the engine speed control is switched from the intake air flow control to the ignition timing control when the feedback correction EQ reaches the upper limit $EQ_{MAX}$, for the reason as described below.

Since the ignition timing is generally advanced when the ignition timing control is conducted, an exhaust temperature is reduced, and it takes a long time to raise a temperature of an exhaust purifying catalyst. Therefore, when the engine speed control is switched to the ignition timing control, the engine is operated for a long time with the temperature of the exhaust purifying catalyst being lower than its activation temperature. As a result, the overall exhaust properties during starting of the engine is likely to be degraded. According to the present embodiment, the intake air flow control is conducted as much as possible in order to prevent such degradation in the exhaust properties. Thus, switching to the ignition timing control is conducted only if it is determined that the engine speed can no longer be controlled by the intake air flow control due to a poor combustion state, for example. If the engine speed falls below the target value due to the deterioration of the combustion state, for example, the feedback correction EQ is increased by the intake air flow control in order to raise the engine speed. Moreover, in the presence of the integral term IDNE, the feedback correction EQ continues to be increased as long as the actual engine speed NE is lower than the target value. Therefore, when the feedback correction EQ is increased to a certain large value, it can be determined that the engine speed is not likely to be settled at the target value by the intake air flow control. Therefore, in the present embodiment, when the feedback correction EQ reaches a predetermined upper limit $EQ_{MAX}$, it is determined that reduction in the engine speed caused by the poor combustion state can no longer be restored by the intake air flow control. For this reason, switching to the ignition timing control is conducted.

Hereinafter, the process of the ignition timing control according to the present embodiment will be described. In the present embodiment, when switching from the intake air flow control to the ignition timing control is conducted as described above, a feedback correction of the ignition timing is set in a manner similar to that of the intake air flow control. In other words, the feedback correction of the ignition timing is set according to the proportional integral and differential control based on the deviation DNE of the actual engine speed NE from the target engine speed $NE_0$. In the present embodiment, however, when the ignition timing control is started, the ignition timing is advanced by a predetermined amount $K_3$, in addition to the feedback correction. Since the engine speed control is switched from the intake air flow control to the ignition timing control in response to a poor combustion state of the engine, the engine speed has been reduced in proportional to the degree of deterioration of the combustion state. Therefore, at the time when the ignition timing control is started, the ignition timing must be advanced significantly in order to raise the engine speed to the target value. In this case, it may take a long time to raise the engine speed if the controller waits for the feedback correction of the ignition timing to be increased by the feedback control based on the difference between the actual and target engine speeds. Therefore, in the present embodiment, when the ignition timing control is started, the ignition timing is always advanced by the predetermined value $K_3$ from the previous value regardless of the engine speed. In this manner, the engine speed is raised as soon as the ignition timing control is started. As a result, the engine speed is quickly settled at the target value.

Figure 18:
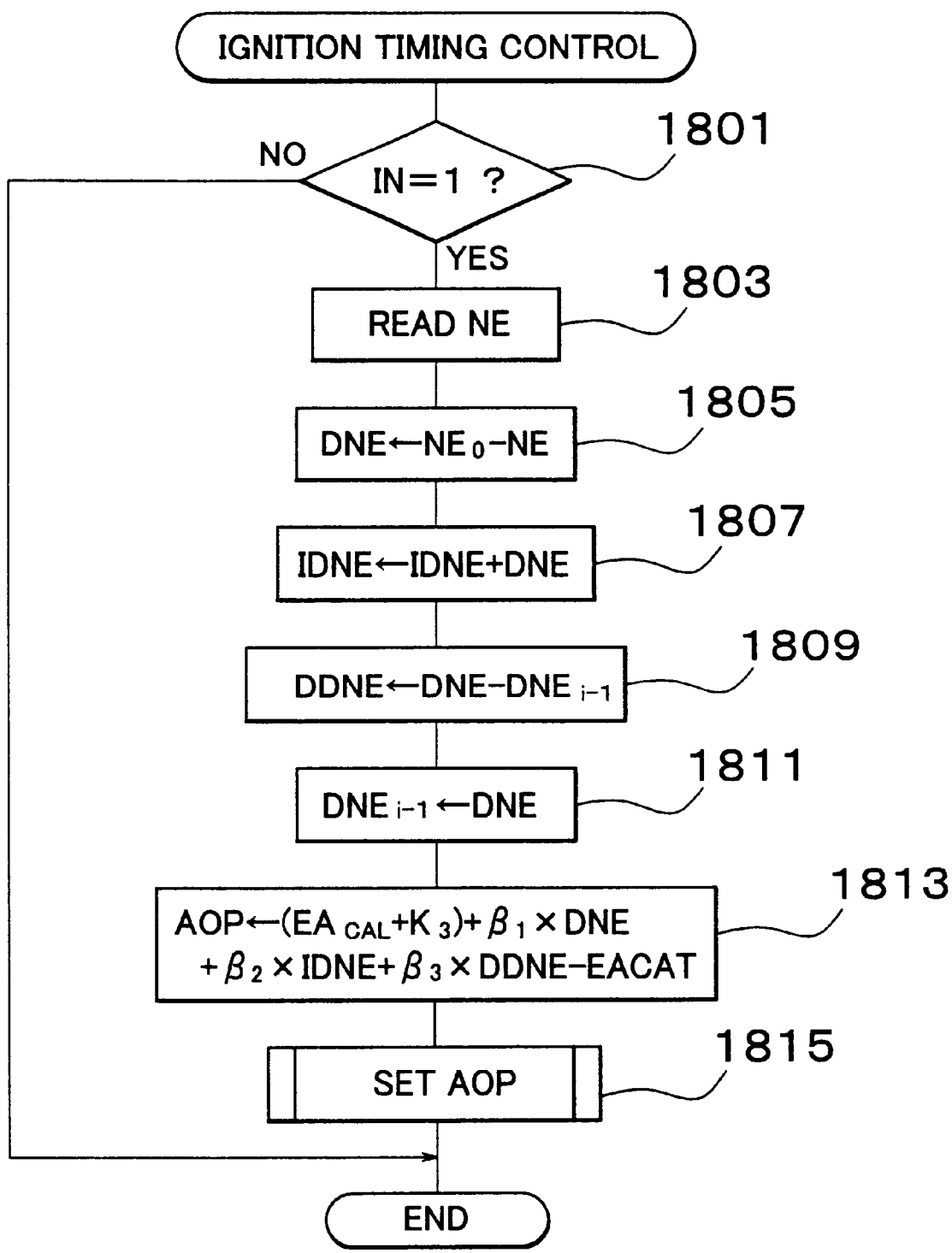
FIG. 18 is a flowchart illustrating one example of a process of the ignition timing control.

FIG. 18 is a flowchart illustrating the process of the ignition timing control according to the present embodiment. This control routine is executed by the ECU at regular time intervals.

When the process shown in FIG. 18 is started, whether the ignition timing control flag IN has been set to 1 or not is determined in step 1801. The process of FIG. 18 is executed only if the flag IN has been set to 1. Thus, switching from the intake air flow control to the ignition timing control is conducted as soon as the flag IN is set to 1 in the process of FIG. 17.

In steps 1803 to 1807, the difference DNE between the target engine speed $NE_0$ and the actual engine speed NE, as well as the integral and differential values IDNE and DDNE of the difference DNE, are calculated in a manner similar to steps 1703 to 1709 of FIG. 17.

Moreover, in the present embodiment, the ignition timing AOP is set according to the following expression using DNE, IDNE and DDNE: $AOP = EA_{CAL} + K_3 + \beta_1 \times DNE + \beta_2 \times IDNE + \beta_3 \times DDNE - EACAT$. Then, in step 1815, the ignition timing AOP set in the above manner is set to the ignition circuit 110, and the process is terminated.

In the above expression, the ignition timing AOP is represented by a crank angle before or ahead of the top dead center of each cylinder. Therefore, the ignition timing is advanced as the value AOP is increased. $EA_{CAL}$ is a basic ignition timing that is determined from a temperature of the engine cooling water; $\beta_1$, $\beta_2$ and $\beta_3$ are coefficients (feedback-control constants) of a proportional term, integral term and differential term, respectively; $K_3$ is a positive predetermined value; and EACAT is a delay amount for warm-up of the catalyst. The delay amount EACAT will be described later.

As described above, in the ignition timing control as well, the feedback correction ($\beta_1 \times DNE + \beta_2 \times IDNE + \beta_3 \times DDNE$) is set by the proportional integral and differential control based on the difference DNE between the target and actual engine speeds. However, the ignition timing control is different from the intake air flow control in that the advance amount $K_3$ is always added to the basic injection timing $EA_{CAL}$.

More specifically, when the ignition timing control is started, the ignition timing is advanced stepwise by $K_3$. Thus, the engine speed is increased at a higher rate, so that the engine speed is quickly settled at the target value $NE_0$.

Hereinafter, the step advance amount $K_3$ added upon the start of the ignition timing control will be explained. The step advance amount $K_3$ may be set as a fixed value. However, in the present embodiment, the step advance amount $K_3$ is set according to the degree of deterioration of the combustion state. More specifically, if the degree of deterioration of the combustion state is large, the engine speed has been reduced to a large extent at the time when the ignition timing control is started. Therefore, the engine speed must be raised at a high rate. According to the present embodiment, the step advance amount $K_3$ is increased as the degree of deterioration of the combustion state, that is, the difference DNP in the peak engine speed, is increased, so that the engine speed can be quickly increased.

Figure 19:
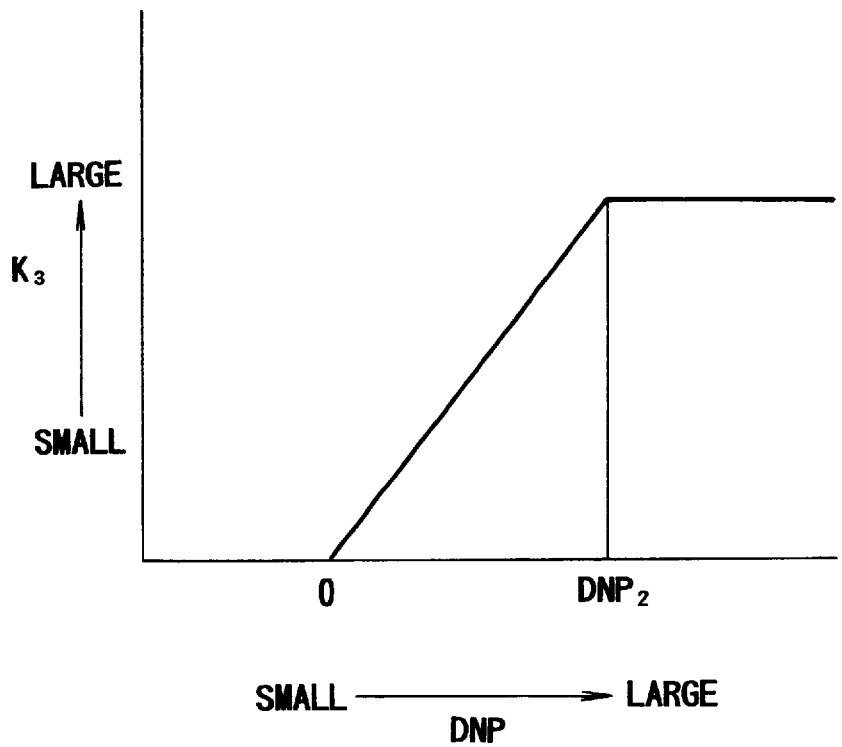
FIG. 19 is a graph used for setting a parameter in the process of FIG. 18.

FIG. 19 is a diagram showing the relationship between the step advance amount $K_3$ and the difference DNP in the peak engine speed, according to the present embodiment. As shown in FIG. 19, the step advance amount $K_3$ is set to zero in the negative region of DNP, and is linearly increased in the region where DNP is between zero and a predetermined value $DNP_2$. $K_3$ has a fixed value in the region where DNP is equal to or higher than $DNP_2$. Thus, the step advance amount $K_3$ is increased with an increase in the degree of deterioration of the combustion state.

Hereinafter, the reference peak engine speed $NEP_0$ used to calculate the difference DNP will be explained. It is possible to measure a peak engine speed in advance by an experiment in which the engine operates in a good combustion state, and store the measured value as the reference peak engine speed $NEP_0$ in the ROM of the ECU 10. However, variations may arise in the peak engine speed during starting of the engine, because of differences among individual engines, and changes in the internal friction resulting from chronological changes in the engines. Therefore, in the present embodiment, the reference peak engine speed $NEP_0$ is set based on the peak engine speed NEP detected every time the engine is actually started.

More specifically, the ECU 10 stores in the RAM a peak engine speed NEP detected during starting of the engine. When the engine has been warmed up into a normal operation state, the ECU 10 determines whether the ignition timing control flag IN was set to 1 or not, that is, whether or not the ignition timing control was executed in the current engine starting operation. If not, it can be determined that the engine was not in a poor combustion state in the current engine starting operation. In this case, the peak engine speed stored during the current engine starting operation is stored as the reference peak engine speed $NEP_0$ in a backup RAM for use in the next engine starting operation. If the ignition timing control was executed in the current engine starting operation, the reference peak engine speed $NEP_0$ obtained up to the previous engine starting operation is used as it is in the next engine starting operation without being updated. Thus, deterioration in the combustion state can be accurately determined even if there are differences among individual engines, changes in the internal friction resulting from chronological changes, and others.

(9) Ninth Embodiment

Hereinafter, the ninth embodiment of the present invention will be described.

In the eighth embodiment, the intake air flow control and the ignition timing control are performed by the proportional integral and differential control based on the difference DNE between the target and actual engine speeds $NE_0$ and NE. However, each of the coefficients (feedback control constants) $\alpha_1, \alpha_2, \alpha_3$ and $\beta_1, \beta_2, \beta_3$ of the proportional terms $\alpha_1 \times DNE$, $\beta_1 \times DNE$, integral terms $\alpha_2 \times IDNE$, $\beta_2 \times IDNE$, and differential terms $\alpha_3 \times DDNE$, $\beta_3 \times DDNE$ are set to respective fixed values. In the present embodiment, on the other hand, the feedback control constants are set according to the difference DNE and the rate of change DDNE thereof.

For example, if the engine speed is far below the target value, and the difference DNE therebetween is increasing, the feedback correction ($\alpha_1 \times DNE + \alpha_2 \times IDNE + \alpha_3 \times DDNE$), ($\beta_1 \times DNE + \beta_2 \times IDNE + \beta_3 \times DDNE$) must be significantly increased in order to greatly increase the engine speed.

On the other hand, if the engine speed is getting close to the target value, and the difference DNE therebetween is relatively small and is decreasing, the engine speed must be increased at a low rate, or an overshoot may possibly occur with respect to the target value. Therefore, the feedback correction must be set to a small value. In this case, if the feedback control constants are set to fixed values, the feedback correction is not always set to an appropriate value, and settlement at the target value may be delayed.

In the present embodiment, the feedback control constants are set according to the difference DNE and its increase/decrease tendency (i.e., a differential value DDNE of DNE). As a result, the feedback correction is set to an appropriate value according to the tendency of change in the engine speed. Thus, the time to settle the engine speed at the target value is further reduced.

In the present embodiment, the coefficients $\alpha_2$ and $\beta_2$ of the integral terms among the feedback control constants are changed according to the actual tendency of change in the engine speed. Since the integral term is an integrated value of differences between the actual and target engine speeds, the integral term itself is changed by a relatively small degree even if the difference between the engine speeds is changed. As a result, the tendency of change in the engine speed is less likely to be reflected in the integral term, as compared to the proportional and differential terms. Accordingly, in the case where the feedback control constants are changed according to the tendency of change in the engine speed, it is the most effective way, in terms of reducing the settlement time of the engine speed, to change the coefficient of the integral term according to the tendency of change in the engine speed so that the tendency of change in the engine speed is reflected by an increased degree in the integral term. It should be appreciated that a greater effect can be obtained if the proportional and differential terms are also changed according to the tendency of change in the engine speed.

First, the integral term of the present embodiment will be explained. In the eighth embodiment, the integral term IDNE is calculated as an integrated value ΣDNE of the difference DNE in the engine speed, and the integral term IDNE is multiplied by the fixed coefficient $\alpha_2, \beta_2$ to calculate the feedback correction. Namely, in the case of intake air flow control of FIG. 17, the feedback correction EQ is calculated as given by the expression (1): $EQ = \alpha_1 \times DNE + \alpha_2 \times IDNE$ ($=\Sigma DNE$)$+ \alpha_3 \times DDNE$. In the present embodiment, however, DNE is multiplied by $\alpha_2$ in advance of integration, and the integral term IDNE is calculated as $\Sigma(\alpha_2 \times DNE)$. Therefore, the feedback correction EQ is calculated as given by the expression (2): $EQ = \alpha_1 \times DNE + IDNE$ ($=\Sigma(\alpha_2 \times DNE)$)$+\alpha_3 \times DDNE$. These expressions (1) and (2) are identical with each other if $\alpha_2$ is a fixed value.

In the present embodiment, the coefficient $\alpha_2$ of the integral term is changed according to the difference DNE in the engine speed and its rate of change DDNE. Therefore, the tendency of change in the engine speed is reflected in the integral term in a more appropriate manner. As described above, $\alpha_2$ is set in accordance with the values DNE and DDNE. In the present embodiment, the most appropriate value of $\alpha_2$ ($\beta_2$ for the ignition timing control) is set in advance through experiments, or the like, in accordance with each combination of DNE and DDNE, and IDNE multiplied by $\alpha_2$, or QIDNE ($=\alpha_2 \times DNE$), is stored in the ROM 104 of the ECU 10 in the form of a numerical map of DNE and DDNE. By using the values DNE and DDNE calculated upon each execution of the process of FIG. 17, QIDNE ($=\alpha_2 \times DNE$) is read from the numerical map as an increase/decrease amount of the integral term. Then, the feedback correction EQ is calculated using the above-indicated expression (2), that is, $EQ = \alpha_1 \times DNE + IDNE$ ($=\Sigma QIDNE$)$+ \alpha_3 \times DDNE$.

Figure 24:
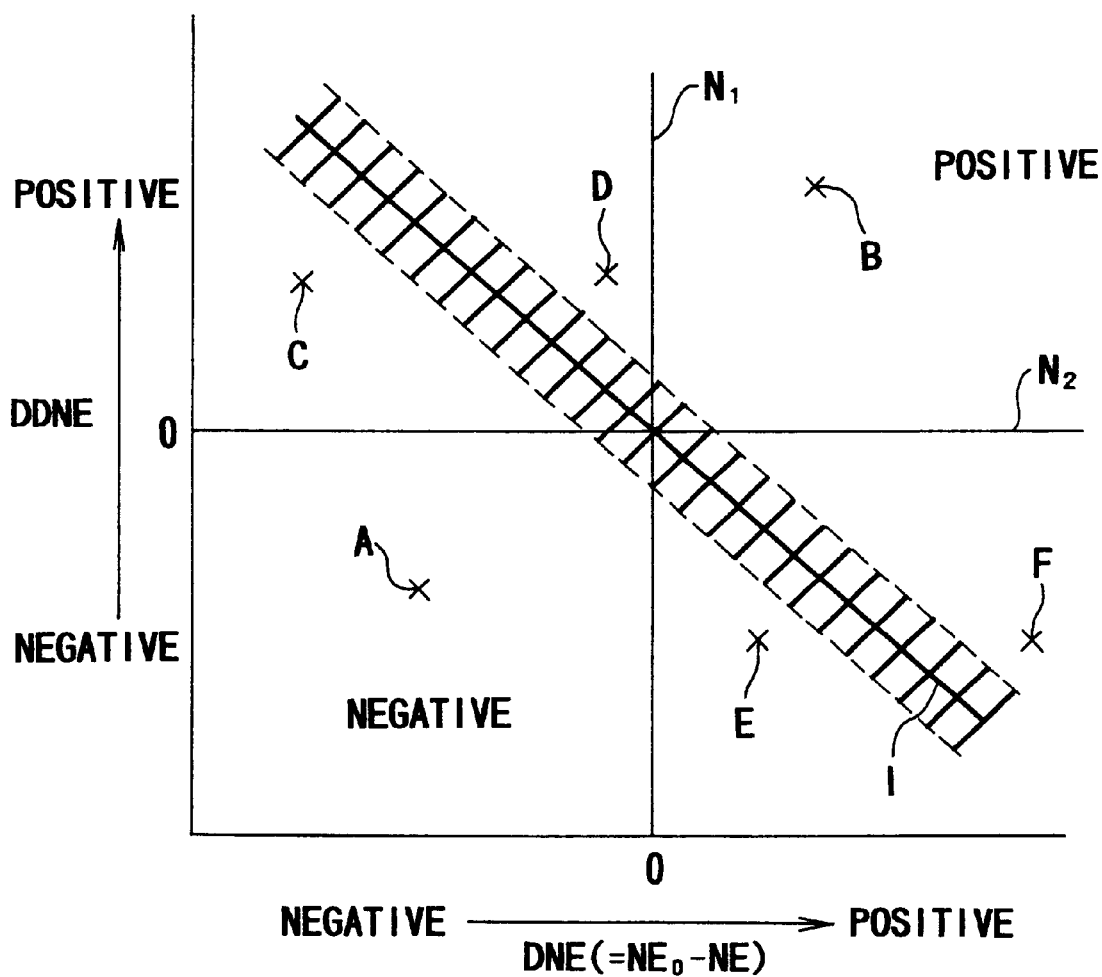
FIG. 24 is a graph showing an example of setting of a parameter in the process of FIG. 17.

FIG. 24 is a diagram illustrating setting of the change amount QIDNE (=$\alpha_2 \times$DNE) of the integral term. In FIG. 24, the horizontal axis indicates the difference DNE between the target and actual engine speeds (DNE=$NE_0$ −NE), and the vertical axis indicates a rate of change DDNE thereof. Moreover, in FIG. 24, the line $N_1$ represents DNE=0 (the actual engine speed is equal to the target value), and the line $N_2$ represents DDNE=0 (the engine speed is stable). As described below, the line I represents QIDNE=0. In the present embodiment, the line I is given as a straight line passing through the point of DNE=0, DDNE=0 and inclined at 45 degrees downward to the right.

In the case of DNE<0 and DDNE<0 in FIG. 24 (point "A" in FIG. 24), the engine speed NE is higher than the target value $NE_0$ (since DNE (=$NE_0$ −NE)<0), and the difference in the engine speed is a negative value higher than that in the previous cycle (since DDNE<0). This means that the engine speed still has an increasing tendency though it has already been higher than the target value. Therefore, the integral value IDNE must be reduced in order to reduce the feedback correction EQ. In this case, in the present embodiment, $\alpha_2$ is set such that the change amount QIDNE (=$\alpha_2 \times$DNE) of the integral term becomes negative, and that the value QIDNE becomes a larger negative value as the difference DNE in the engine speed is a larger negative value (i.e., as the engine speed is higher) and as the rate of change DDNE is a larger negative value (i.e., as the engine speed increases at a higher rate).

In the case of DNE>0 and DDNE>0 (point "B" in FIG. 24), the engine speed is lower than the target value, and the difference in the engine speed is increasing (i.e., the engine speed is decreasing). In this case, the integral term IDNE must be quickly increased in order to increase the feedback correction EQ. Thus, $\alpha_2$ is set such that the change amount QIDNE (=$\alpha_2 \times$DNE) of the integral term becomes positive, and that QIDNE becomes a larger positive value as the difference DNE in the engine speed is a larger positive value (i.e., as the engine speed is lower) and as the rate of change DDNE is a larger positive value (i.e., as the engine speed decreases at a higher rate).

Hereinafter, points C and D of FIG. 24 are considered. In both cases, DNE<0 and DDNE>0. Therefore, the engine speed is higher than the target value, but the difference in the engine speed is decreasing (the engine speed is decreasing). In this case, the sign of the value QIDNE must be changed depending upon the values of DNE and DDNE. For example, at point C of FIG. 24, DNE is a relatively large negative value, and therefore the engine speed greatly exceeds the target value. In this case, although the engine speed has a decreasing tendency, it is preferable to somewhat increase the rate of reduction in the engine speed so as to settle the engine speed quickly at the target value. In this case, QIDNE is set to a relatively small negative value. At point D of FIG. 24, on the other hand, DNE is a relatively small negative value. Therefore, the engine speed is higher than, but is relatively close to, the target value. Moreover, since DDNE>0, the difference in the engine speed is decreasing (the engine speed is decreasing). Therefore, if IDNE remains high, an overshoot may occur that causes the engine speed to decrease below the target value. Then, at point D, QIDNE is set to a relatively small positive value so as to increase IDNE at a low rate.

Similarly, in the case of points E and F (DNE>0, DDNE<0) in FIG. 24, QIDNE is set to a relatively small negative value for point E, while being set to a relatively small positive value for point F.

At a point on the line I of FIG. 24, the values DNE and DDNE cancel each other. Therefore, the integral term IDNE is held at the value obtained in the previous cycle without increasing nor decreasing. As a result, at any point on the line I, QIDNE is set to zero. Accordingly, the line I serves as a boundary between the positive and negative regions of QIDNE. Moreover, in the present embodiment, the control is stabilized by defining a region extending within a fixed distance from the line I (i.e., the hatched region of FIG. 24). In this region, QIDNE is set to zero so that QIDNE does not change even if DNE and IDNE are changed.

As described above, in the present embodiment, QIDNE (=$\alpha_2 \times$DNE) is positive in the region above the hatched region of FIG. 24, while being negative in the region below the same region, and an absolute value of QIDNE increases as the distance from the line I is increased.

Thus, by setting the feedback control constants ($\alpha_2$, $\beta_2$) according to the values DNE and DDNE each time the process is executed, the feedback correction is set to an appropriate value according to the tendency of change in the engine speed. As a result, the time to settle the engine speed at the target value is reduced.

(10) Tenth Embodiment

Hereinafter, the tenth embodiment of the present invention will be described.

In the present embodiment, a delay amount of the ignition timing for raising the temperature of the catalyst during the ignition timing control is suitably adjusted, so that the ignition timing control and the delay in the ignition timing for warming up the catalyst are prevented from interfering with each other, and the engine speed can be settled at the target vale in a short time.

As described above in conjunction with FIG. 18, while the ignition timing control is being performed, the ignition timing AOP is set as the sum of the basic ignition timing $EA_{CAL}$ determined from a temperature of the engine cooling water ($EA_{CAL}+K_3$ in the example of FIG. 18) and the feedback correction ($\beta_1 \times$DNE+$\beta_2 \times$IDNE+$\beta_3 \times$DDNE in the example of FIG. 18), plus the delay amount (-EACAT) for warm-up of the catalyst. The delay amount EACAT for warming up the catalyst is provided for increasing the exhaust temperature during starting of the engine and quickly raising the temperature of the exhaust purifying catalyst to its activation temperature. After the engine starting operation is started, EACAT is gradually increased, and then, is slowly decreased to zero after a predetermined period of time has passed since the engine starting operation was started.

Actually, the EACAT is given by the following expression: EACAT=RF×$EACAT_{BASE}$. $EACAT_{BASE}$ is a basic delay amount for warming up the catalyst, which is given in advance as a function of the temperature of the engine cooling water. RF is a reflection coefficient, which is given as a function of time after the engine starting operation is started.

Figure 20:
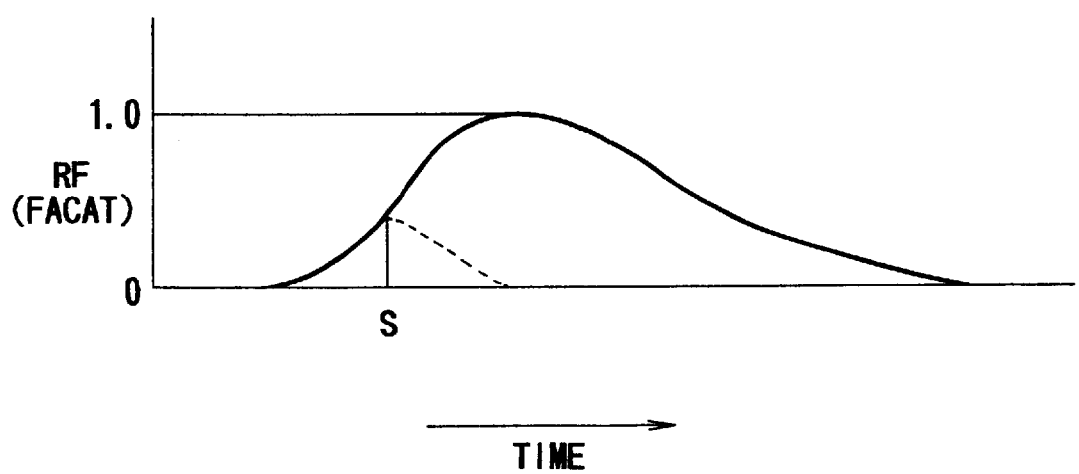
FIG. 20 is a diagram showing changes in the delay amount for warming up a catalyst with time.

FIG. 20 is a diagram showing changes in RF with time after the engine starting operation is started. As shown in FIG. 20, the reflection coefficient RF is set to zero for a predetermined time period t, after the engine starting operation is started, in order to facilitate start of the engine. The RF starts increasing a few seconds after the engine starting operation is started. When RF reaches 1, RF starts gradually decreasing to zero. With the RF thus changed, the EACAT also changes as shown in FIG. 20 after the engine starting operation is started. On the other hand, the ignition timing control changes the ignition timing so as to settle the engine speed at the target value. Therefore, if the delay amount EACAT increases or decreases during the ignition timing control, such adjustment of the ignition timing by the ignition timing control interferes with the increase or decrease in EACAT, and the engine speed may not be quickly settled at the target value.

According to the present embodiment, the delay amount EACAT (delay coefficient RF) is quickly decreased to zero if the ignition timing control is started, so that the delay in the ignition timing for warming up the catalyst is prevented from interfering with the ignition timing control.

Figure 21:
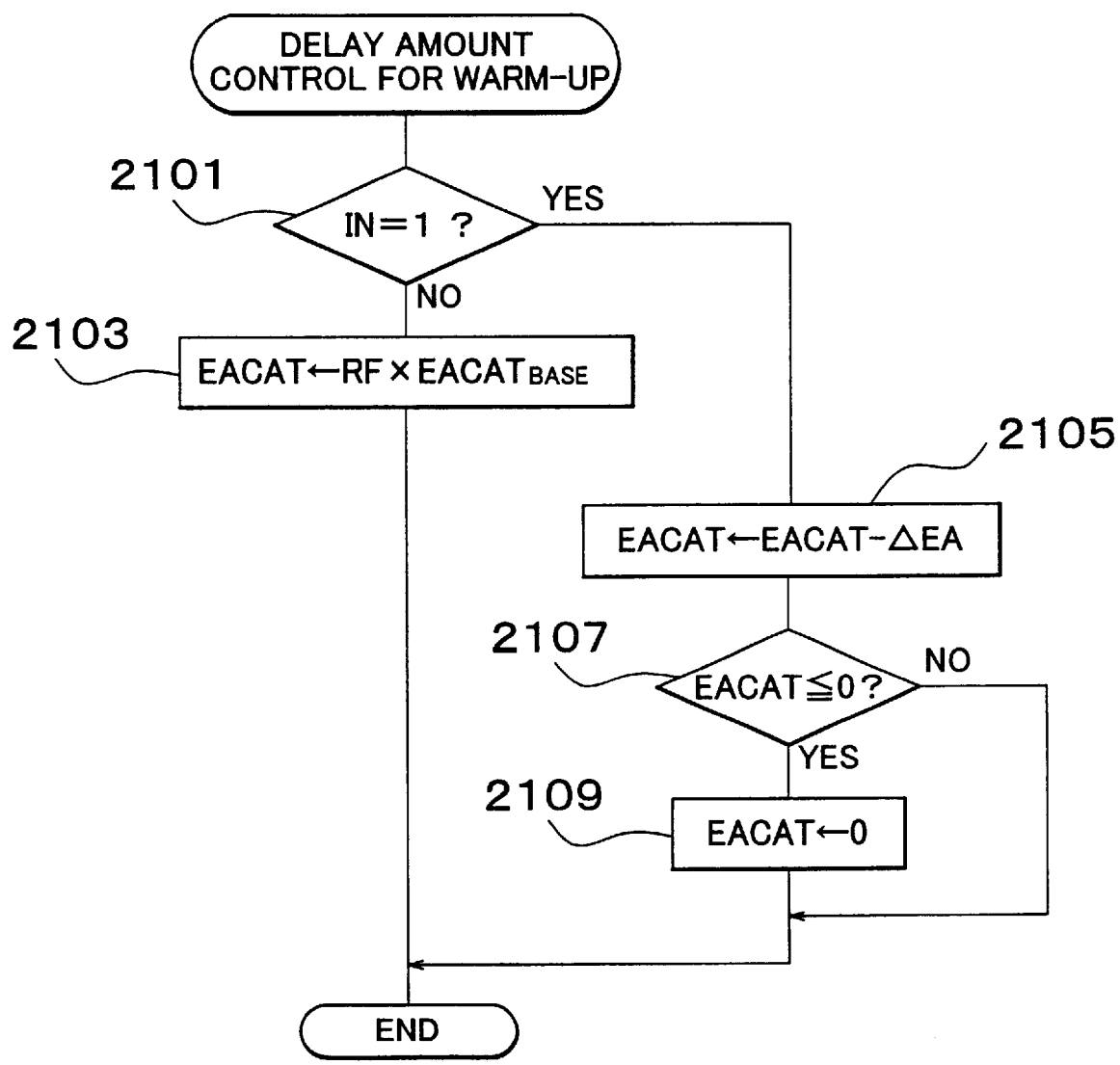
FIG. 21 is a flowchart illustrating one example of a process of controlling the delay amount for warming up the catalyst.

FIG. 21 is a flowchart illustrating a process of controlling the delay amount for warming up the catalyst according to the present embodiment. This control routine is executed by the ECU 10 at fixed time intervals.

In the process of FIG. 21, EACAT is set as EACAT=RF× $EACAT_{BASE}$ as in normal operations when the ignition timing control is not performed. When the ignition timing control is started, however, EACAT is no longer set according to the above expression. Instead, EACAT is decreased stepwise by a fixed amount from the current value to zero. In the present embodiment, EACAT changes as shown by the solid line of FIG. 20 when the ignition timing control is not performed. However, when the ignition timing control is started at, for example, point S in FIG. 20, EACAT decreases linearly as shown by the dotted line of FIG. 20. As a result, EACAT decreases to zero faster than it does when the ignition timing control is not conducted.

More specifically, when the process of FIG. 21 is started, whether the ignition timing control is being conducted or not is determined in step 2101 from the ignition timing control flag IN. If IN≠1, that is, if the ignition timing control is not being performed ("NO" in step 2101), the control flow goes to step 2103 in which the delay amount EACAT is set as EACAT=RF×$EACAT_{BASE}$. Thus, the delay amount EACAT changes as shown by the solid line (normal operation) of FIG. 20 after the engine starting operation is started.

If it is determined that the ignition timing control is being performed in step 2101 (i.e., if IN=1), the control flow goes to step 2105 in which the current delay amount EACAT is reduced by a fixed value ΔEA. Thereafter, in steps 2107 and 2109, EACAT is limited to have a minimum value of zero. Thus, as soon as the ignition timing control is started, EACAT decreases stepwise by the fixed value ΔEA (dotted line, FIG. 20) each time the process is executed. Therefore, EACAT is decreased to zero earlier and faster than usual (solid line, FIG. 20). As a result, the adjustment of the ignition timing by the ignition timing control is prevented from interfering with the delay in the ignition timing for warming up the catalyst, whereby the engine speed can be quickly settled at the target value.

In the present embodiment, the delay amount starts decreasing as soon as the ignition timing control is started. However, in the case where the combustion state is deteriorated by a relatively small degree, the ignition timing may not be significantly advanced even if the ignition timing control is started. In such a case, if the delay amount is reduced in early stage, warm-up of the catalyst is delayed, whereby the overall exhaust properties may be degraded. Thus, instead of starting decreasing the delay amount as soon as the ignition timing control is started, the delay amount may start being reduced as soon as the ignition timing is advanced at least by a certain degree with the ignition timing control, that is, as soon as it is determined that the combustion state is deteriorated by a certain degree.

In such a case, instead of performing the reducing operation of step 2105 and subsequent steps when the ignition timing control flag IN is 1 in step 2101 of FIG. 21, the reducing operation of step 2105 and subsequent steps may be conducted as follows: whether the feedback correction in the ignition timing control ($\beta_1 \times$DNE+$\beta_2 \times$IDNE+$\beta_3 \times$DDNE in the example of FIG. 18) is increased at least to a predetermined value or not is determined in step 2101. In other words, it is determined whether the ignition timing is to be advanced at least by a predetermined value with the ignition timing control. Then, step 2105 and subsequent steps are executed if the feedback correction is increased at least to the predetermined value.

(11) Eleventh Embodiment

The present embodiment is similar to the tenth embodiment in that an operation of decreasing the delay amount for warming up the catalyst is conducted while the ignition timing control is conducted. However, the present embodiment is different from the tenth embodiment in that the delay amount EACAT is always decreased by a fixed amount in the tenth embodiment, while EACAT is decreased according to the degree of deterioration of the combustion state in the present embodiment.

As described above, if the degree of deterioration of the combustion state is large, the amount by which the ignition timing is advanced in the ignition timing control is increased. Therefore, if the delay amount is set to a large value when the degree of deterioration is large, the engine speed control may not be accurately performed with ignition timing control.

According to the present embodiment, therefore, the deviation DNP of the peak engine speed NEP from the reference peak engine speed $NEP_0$ (DNP=$NEP_0$ −NEP) is used as a parameter of determining the degree of deterioration of the combustion state. Thus, the delay amount for warming up the catalyst is adjusted such that the delay amount is reduced by a large degree if the degree of deterioration is large (i.e., if DNP is large), while being reduced by a small degree if the deterioration degree is small (i.e., if DNP is small).

Figure 22:
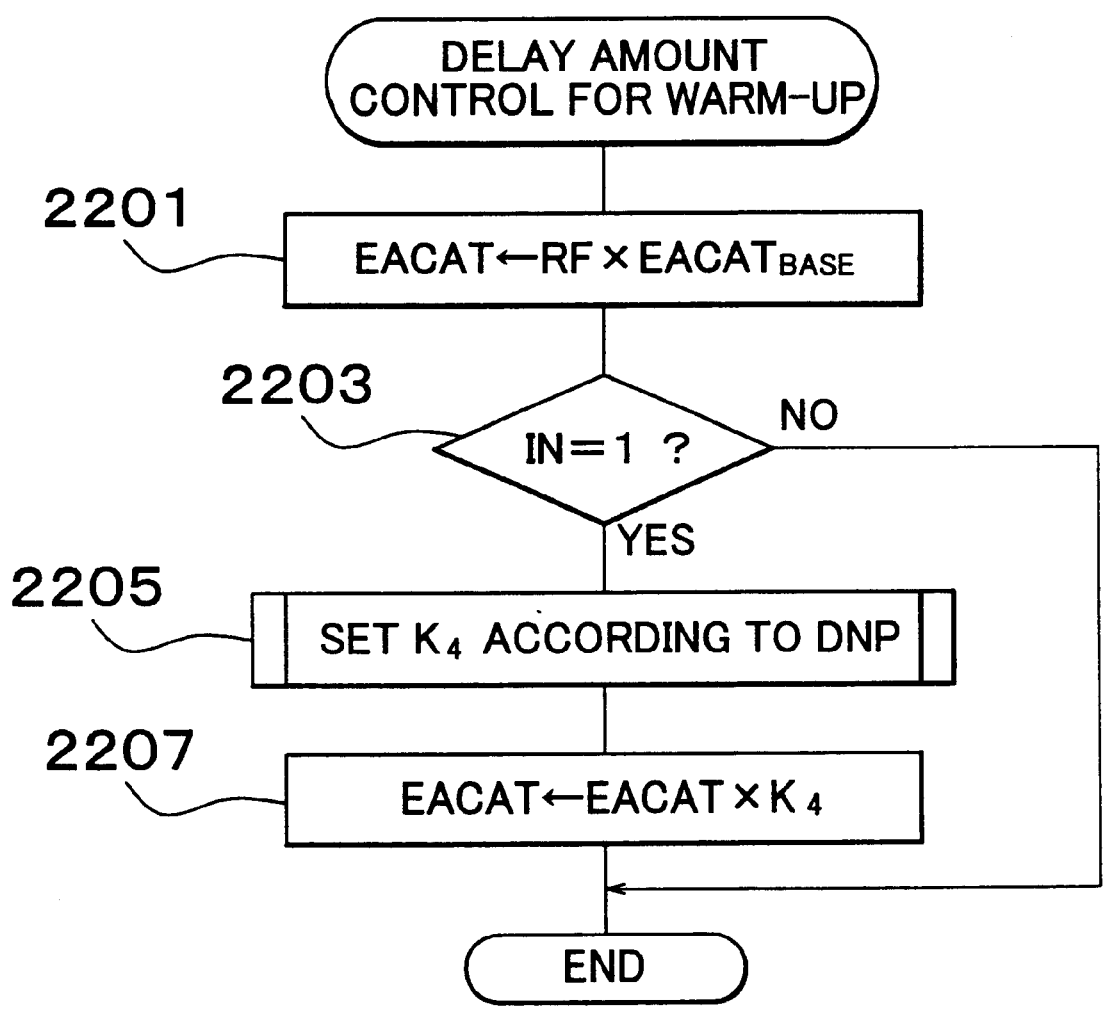
FIG. 22 is a flowchart illustrating another example of the process of controlling the delay amount for warming up the catalyst.

FIG. 22 is a flowchart illustrating a process of controlling the delay amount for warming up the catalyst according to the present embodiment. This control routine is executed by the ECU 10 at regular time intervals.

When the process of FIG. 22 is started, the delay amount EACAT for warm-up of the catalyst is first calculated as EACAT=RF×$EACAT_{BASE}$ in step 2201. Then, in step 2203, whether the ignition timing control is being conducted or not is determined based on the ignition timing control flag IN. If the ignition timing control is not being conducted (i.e., if IN≠1), the process is terminated immediately. In this case, the delay amount is set to a normal value that is obtained in step 2201. On the other hand, if the ignition timing control is being conducted (i.e., if IN=1), the control flow goes to step 2205. In step 2205, a coefficient $K_4$ for decreasing the delay amount ($K_4 \leq 1$) is determined based on the deviation DNP of the peak engine speed NEP detected during starting of the engine from the predetermined reference peak engine speed $NEP_0$. Then, in step 2207, the normal delay amount EACAT (which was calculated in step 2201) multiplied by the coefficient $K_4$ is set as the delay amount EACAT, and the process is terminated.

Figure 23:
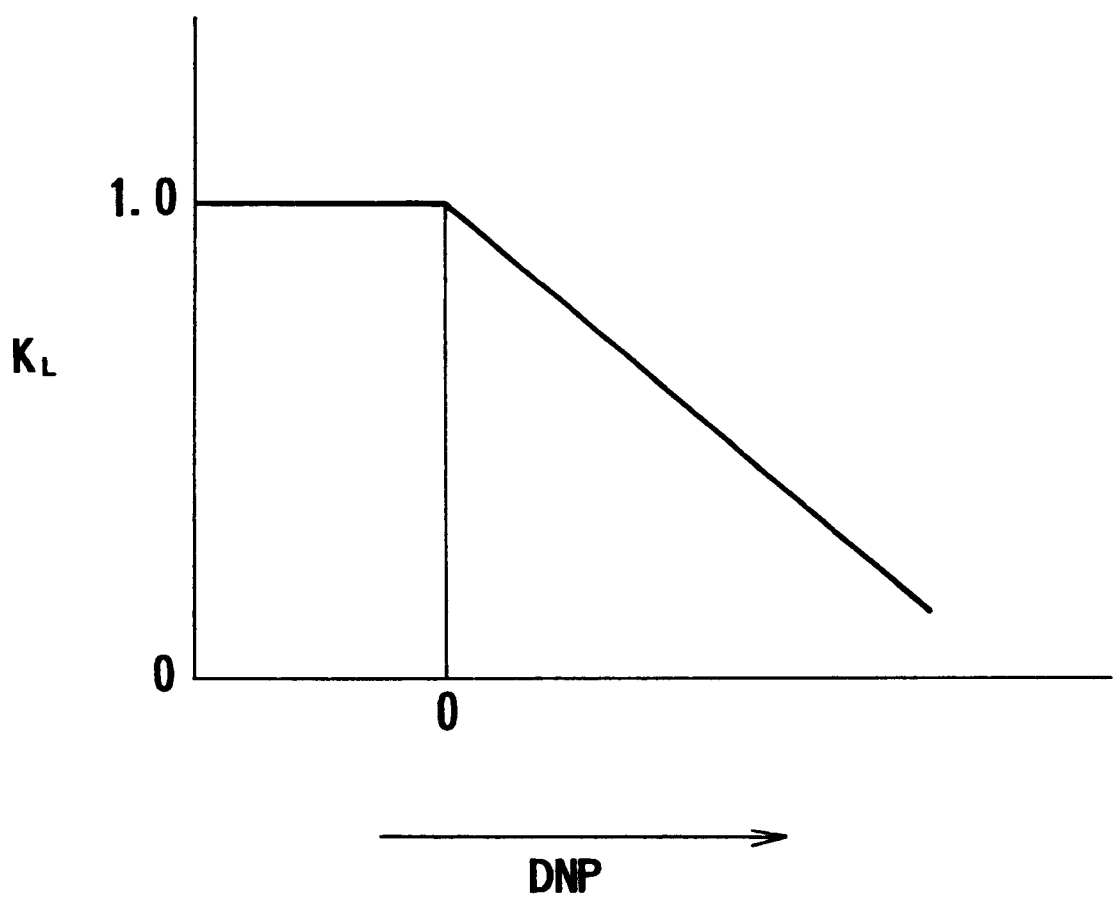
FIG. 23 is a graph used for setting a parameter in the process of FIG. 22.

FIG. 23 is a graph showing the setting of the coefficient $K_4$. As shown in FIG. 23, $K_4$ is set to 1 in the negative region of DNP. In the positive region of DNP, $K_4$ is reduced as DNP is increased (i.e., as the degree of deterioration of the combustion state is increased). Thus, in step 2207 of FIG.

22, the delay amount for warming up the catalyst is decreased as the degree of deterioration of the combustion state is increased. Therefore, the ignition timing control and the delay of the ignition timing for warm-up of the catalyst will not interfering with each other.

In the present embodiment, the coefficient $K_4$ is continuously changed according to the value DNP, as shown in FIG. 23. However, the control may also be simplified by, for example, setting the coefficient $K_4$ in two stages depending upon whether DNP is at least a predetermined value or not. Moreover, while the coefficient $K_4$ is set according to the difference DNP in the peak engine speed, $K_4$ may be set according to the feedback correction by using the relationship similar to that of FIG. 23, since the feedback correction after the ignition timing control is started ($\beta_1 \times$DNE+$\beta_2 \times$IDNE+$\beta_3 \times$DDNE in the example of FIG. 18) represents an advance amount by the ignition timing control.

The illustrated embodiments of the present invention yield a common effect to enable the engine speed to be quickly and smoothly settled at the target value during starting of the engine.

What is claimed is:

1. A control apparatus for an internal combustion engine, which controls an engine speed to a target engine speed during starting of the engine, by performing at least one control including intake air flow control under which an intake air flow rate is adjusted in accordance with the engine speed, and ignition timing control under which the ignition timing is adjusted in accordance with the engine speed, comprising:

a parameter acquiring unit that obtains a parameter that represents a degree of deterioration of a combustion state in the engine; and a switching unit that control switching from the intake air flow control to the ignition timing control based on the parameter obtained by said parameter acquiring unit.

2. A control apparatus according to claim 1, wherein said parameter acquiring unit calculates a difference between a predetermined reference peak engine speed and an actual peak engine speed during starting of the engine, to provide the parameter, said switching unit switching from the intake air flow control to the ignition timing control, depending upon the difference between the peak engine speeds.

3. A control apparatus according to claim 2, wherein said switching unit continues the intake air flow control when the actual peak engine speed is greater than the reference peak engine speed, wherein when the actual peak engine speed is smaller than the reference peak engine speed and the difference between the peak engine speeds is smaller than an upper limit value that is a predetermined positive value, said switching unit sets a reference air flow rate according to the difference between the peak engine speeds, and switches from the intake air flow control to the ignition timing control when an actual intake air flow rate of the engine becomes larger than the reference air flow rate, and wherein said switching unit immediately switches from the intake air flow control to the ignition timing control when the difference between the peak engine speeds is larger than said upper limit value.

4. A control apparatus according to claim 1, further comprising:

a control unit that starts the ignition timing control with the ignition timing being advanced by a predetermined advance amount, relative to the ignition timing before the start of the ignition timing control.

5. A control apparatus according to claim 1, further comprising:

a setting unit that sets a feedback control constant for use in at least one of the intake air flow control and the ignition timing control, based on a difference between the target engine speed and an actual engine speed of the engine, and a rate of change of the difference.

6. A control apparatus according to claim 1, further comprising:

a catalyst warm-up unit that delays the ignition timing by a catalyst warm-up delay amount during starting of the engine, so as to increase a temperature of an exhaust purifying catalyst disposed in an engine exhaust passage, said catalyst warm-up delay amount being measured from ignition timing after the temperature of the exhaust purifying catalyst is increased, said catalyst warm-up unit changing the catalyst warm-up delay amount so that the delay amount becomes equal to zero upon a lapse of a predetermined time from start of an engine starting operation; wherein said catalyst warm-up unit changes the catalyst warm-up delay amount so that the catalyst warm-up delay amount becomes equal to zero in a shorter period of time during execution of the ignition timing control for controlling the engine speed, as compared with the case where the ignition timing control is not being executed.

7. A control apparatus for an internal combustion engine, which controls an engine speed to a target engine speed during starting of the engine, by performing at least one control including intake air flow control under which an intake air flow rate is adjusted in accordance with the engine speed, and ignition timing control under which the ignition timing is adjusted in accordance with the engine speed, comprising:

a determining unit that determines whether the engine speed is reduced to be lower than a first predetermined speed after reaching a peak engine speed during starting of the engine; and a switching unit that switches from the intake air flow control to the ignition timing control irrespective of a value of the peak engine speed, if the engine speed is reduced to be lower than the first predetermined speed.

8. A control apparatus according to claim 7, wherein said switching unit performs fuel injection quantity control in which an increased quantity of fuel is supplied to the engine, in addition to the injection timing control, when the engine speed is reduced to be lower than a second predetermined speed that is smaller than said first predetermined speed after reaching the peak engine speed during starting of the engine.

9. A control apparatus for an internal combustion engine, which performs engine speed control for controlling an engine speed to a target engine speed in a feedback manner during starting of the engine, comprising:

an integrating unit that integrates an intake air quantity that has been introduced into the engine since the start of an engine starting operation; and a control unit that starts the engine speed control when an integrated value of the intake air quantity calculated by said integrating unit reaches a value that is equal to a volume of an intake air passage that extends from a throttle valve to an inlet of each cylinder.

10. A control apparatus for an internal combustion engine, which performs engine speed control for controlling an engine speed to a target engine speed in a feedback manner during starting of the engine, comprising:

a detecting unit that detects that the engine speed has reached a peak engine speed during starting of the engine, after the start of an engine starting operation; and a control unit that starts the engine speed control when said detecting unit detects that the engine speed has reached the peak engine speed.

11. A control apparatus according to claim 10, further comprising a target engine speed setting unit that gradually changes the target engine speed with time from the peak engine speed to a predetermined reference speed, from a point of time when the engine speed control is started.

12. A control apparatus according to claim 11, wherein said target engine speed setting unit changes the target engine speed at a smaller rate of change when a deviation of an actual engine speed from the reference speed becomes smaller than a predetermined value after the start of the engine speed control, as compared with the case where said deviation is larger than said predetermined value.

13. A control apparatus for an internal combustion engine, which performs engine speed control for controlling an engine speed to a target engine speed in a feedback manner during starting of the engine, comprising:

a calculating unit that calculates a rate of change of the engine speed; and a control unit that starts the engine speed control when the rate of change of the engine speed calculated by said calculating unit becomes smaller than a predetermined value.

14. A control apparatus for an internal combustion engine, which performs engine speed control for controlling an engine speed to a predetermined target engine speed in a feedback manner during starting of the engine, wherein the engine speed control is started when the engine speed becomes equal to the target engine speed after an engine starting operation is started.

15. A control apparatus for an internal combustion engine, which controls an engine speed to a target engine speed during starting of the engine, by performing at least one control including intake air flow control under which an intake air flow rate is adjusted in accordance with the engine speed, and ignition timing control under which the ignition timing is adjusted in accordance with the engine speed, comprising:

a switching unit that switches from the intake air flow control to the ignition timing control when it is determined that the engine is in a poor combustion state; and a control unit that starts the ignition timing control with the ignition timing being advanced by a certain advance amount, relative to the ignition timing before the start of the ignition timing control.

16. A control apparatus according to claim 15, further comprising:

a detecting unit that detects a peak engine speed that is achieved during starting of the engine after an engine starting operation is started; and a setting unit that sets the advance amount, according to a difference between the peak engine speed and a predetermined reference peak engine speed.

17. A control apparatus according to claim 16, further comprising:

a learning unit that learns the reference peak engine speed, based on the peak engine speed achieved in a previous-control cycle in which the ignition timing control was not executed during starting of the engine.

18. A control apparatus for an internal combustion engine, which controls an engine speed to a target engine speed during starting of the engine, by performing at least one control including intake air flow control under which an intake air flow rate is adjusted in accordance with the engine speed, and ignition timing control under which the ignition timing is adjusted in accordance with the engine speed, comprising:

a switching unit that switches from the intake air flow control to the ignition timing control when it is determined that the engine is in a poor combustion state; and a setting unit that sets a feedback control constant for use in at least one of the intake air flow control and the ignition timing control, based on a difference between the target engine speed and an actual engine speed of the engine, and a rate of change of the difference.

19. A control apparatus according to claim 18, wherein at least one of the intake air flow control and the ignition timing control in which the feedback control constant is set by said setting unit is a proportional, integral and differential control based on a proportional amount that is proportional to a deviation of the actual engine speed from the target engine speed, an integral amount that is a time integral value of the deviation, and a differential amount that is a time differential value of the deviation.

20. A control apparatus for an internal combustion engine, which controls an engine speed to a target engine speed during starting of the engine, by performing at least one control including intake air flow control under which an intake air flow rate is adjusted in accordance with the engine speed, and ignition timing control under which the ignition timing is adjusted in accordance with the engine speed, comprising:

a switching unit that switches from the intake air flow control to the ignition timing control when it is determined that the engine is in a poor combustion state; and a catalyst warm-up unit that delays the ignition timing by a catalyst warm-up delay amount during starting of the engine, so as to increase a temperature of an exhaust purifying catalyst disposed in an engine exhaust passage, said catalyst warm-up delay amount being measured from ignition timing after the temperature of the exhaust purifying catalyst is increased, said catalyst warm-up unit changing the catalyst warm-up delay amount so that the delay amount becomes equal to zero upon a lapse of a predetermined time from start of an engine starting operation; wherein said catalyst warm-up unit changes the catalyst warm-up delay amount so that the catalyst warm-up delay amount becomes equal to zero in a shorter period of time during execution of the ignition timing control for controlling the engine speed, as compared with the case where the ignition timing control is not being executed.

21. A control apparatus for an internal combustion engine, which controls an engine speed to a target engine speed during starting of the engine, by performing at least one control including intake air flow control under which an intake air flow rate is adjusted in accordance with the engine speed, and ignition timing control under which the ignition timing is adjusted in accordance with the engine speed, comprising:

a switching unit that switches from the intake air flow control to the ignition timing control when it is determined that the engine is in a poor combustion state;

a catalyst warm-up unit that delays the ignition timing by a catalyst warm-up delay amount during starting of the engine, so as to increase a temperature of an exhaust purifying catalyst disposed in an engine exhaust passage, said catalyst warm-up delay amount being measured from ignition timing after the temperature of the exhaust purifying catalyst is increased; and a detecting unit that detects a peak engine speed during starting of the engine after an engine starting operation is started; wherein said catalyst warm-up unit sets the catalyst warm-up delay amount to a smaller value during execution of the ignition timing control in accordance with a difference between a predetermined reference peak engine speed and the peak engine speed during starting of the engine, as compared with the case where the ignition timing control for controlling the engine speed is not being executed.

22. A control apparatus for an internal combustion engine, which controls an engine speed to a target engine speed during starting of the engine, by performing at least one control including intake air flow control under which an intake air flow rate is adjusted in accordance with the engine speed, and ignition timing control under which the ignition timing is adjusted in accordance with the engine speed, comprising:

a switching unit that switches from the intake air flow control to the ignition timing control when it is determined that the engine is in a poor combustion state; and a catalyst warm-up unit that delays the ignition timing by a catalyst warm-up delay amount during starting of the engine, so as to increase a temperature of an exhaust purifying catalyst disposed in an engine exhaust passage, said catalyst warm-up delay amount being measured from ignition timing after the temperature of the exhaust purifying catalyst is increased; wherein said catalyst warm-up unit sets the catalyst warm-up delay amount to a smaller value during execution of the ignition timing control in accordance with a feedback correction amount of the ignition timing used in the ignition timing control, as compared with the case where the ignition timing control for controlling the engine speed is not being executed.

23. A method of controlling an internal combustion engine, wherein an engine speed is controlled to a target engine speed during starting of the engine, by performing at least one control including intake air flow control under which an intake air flow rate is adjusted in accordance with the engine speed, and ignition timing control under which the ignition timing is adjusted in accordance with the engine speed, comprising the steps of:

acquiring a parameter that represents a degree of deterioration of a combustion state in the engine; and controlling switching from the intake air flow control to the ignition timing control based on the parameter acquired.

24. A method according to claim 23, wherein the parameter is obtained by calculating a difference between a predetermined reference peak engine speed and an actual peak engine speed during starting of the engine, and wherein the intake air flow control is switched to the ignition timing control, depending upon the difference between the peak engine speeds.

25. A method of controlling an internal combustion engine, wherein engine speed control for controlling an engine speed to a predetermined target engine speed is performed in a feedback manner during starting of the engine, comprising the steps of:

integrating an intake air quantity that has been introduced into the engine since the start of an engine starting operation, to provide an integrated value; and starting the engine speed control when the integrated value of the intake air quantity reaches a value that is equal to a volume of an intake air passage that extends from a throttle valve to an inlet of each cylinder.

26. A method of controlling an internal combustion engine, wherein an engine speed is controlled to a target engine speed during starting of the engine, by performing at least one control including intake air flow control under which an intake air flow rate is adjusted in accordance with the engine speed, and ignition timing control under which the ignition timing is adjusted in accordance with the engine speed, comprising the steps of:

switching from the intake air flow control to the ignition timing control when it is determined that the engine is in a poor combustion state; and delaying the ignition timing by a catalyst warm-up delay amount during starting of the engine, so as to increase a temperature of an exhaust purifying catalyst disposed in an engine exhaust passage, said catalyst warm-up delay amount being measured from ignition timing after the temperature of the exhaust purifying catalyst is increased, said step of delaying the ignition timing comprising the steps of changing the catalyst warm-up delay amount so that the delay amount becomes equal to zero upon a lapse of a predetermined time from start of an engine starting operation, and so that the catalyst warm-up delay amount becomes equal to zero in a shorter period of time during execution of the ignition timing control for controlling the engine speed, as compared with the case where the ignition timing control is not being executed.

\* \* \* \* \*

UNITED STATES PATENT AND TRADEMARK OFFICE
CERTIFICATE OF CORRECTION

PATENT NO. : 6,505,594 B1 Page 1 of 1
DATED : January 14, 2003
INVENTOR(S) : Katayama et al.

It is certified that error appears in the above-identified patent and that said Letters Patent is hereby corrected as shown below:

<u>Title page,</u>
Item [75], Inventor, should read:
-- [75] Inventors: Akihiro Katayama, Susono (JP);
       Masanobu Kanamaru, Mishima (JP);
       Satoru Watanabe, Susono (JP);
       Hidemi Ohnaka, Susono (JP) --

Signed and Sealed this

Twenty-fourth Day of February, 2004

JON W. DUDAS
*Acting Director of the United States Patent and Trademark Office*